(12) United States Patent
Ritter et al.

(10) Patent No.: US 11,489,905 B2
(45) Date of Patent: *Nov. 1, 2022

(54) DATA-CENTRIC INTEGRATION MODELING

(71) Applicant: SAP SE, Walldorf (DE)

(72) Inventors: Daniel Ritter, Heidelberg (DE); Jan Bross, Karlsruhe (DE)

(73) Assignee: SAP SE, Walldorf (DE)

( * ) Notice: Subject to any disclaimer, the term of this patent is extended or adjusted under 35 U.S.C. 154(b) by 220 days.

This patent is subject to a terminal disclaimer.

(21) Appl. No.: 16/531,766

(22) Filed: Aug. 5, 2019

(65) Prior Publication Data
US 2019/0356760 A1 Nov. 21, 2019

Related U.S. Application Data

(63) Continuation of application No. 14/665,825, filed on Mar. 23, 2015, now Pat. No. 10,419,586.

(51) Int. Cl.
| | |
|---|---|
| *H04L 67/01* | (2022.01) |
| *G06F 9/00* | (2006.01) |
| *G06F 9/54* | (2006.01) |
| *G06Q 10/00* | (2012.01) |

(52) U.S. Cl.
CPC ............ *H04L 67/01* (2022.05); *G06F 9/00* (2013.01); *G06F 9/546* (2013.01); *G06Q 10/00* (2013.01)

(58) Field of Classification Search
None
See application file for complete search history.

(56) References Cited

U.S. PATENT DOCUMENTS

| | | | |
|---|---|---|---|
| 8,543,653 B2 | 9/2013 | Bhatt et al. | |
| 8,655,989 B2 | 2/2014 | Ritter et al. | |
| 8,661,107 B2 | 2/2014 | Hoffmann et al. | |
| 8,739,124 B2 | 5/2014 | Ritter et al. | |
| 8,805,769 B2 | 8/2014 | Ritter et al. | |
| 8,850,005 B2 | 9/2014 | Bhatt et al. | |
| 9,032,380 B1* | 5/2015 | Ruthramoorthy | G06F 8/433 717/156 |
| 10,419,586 B2 | 9/2019 | Ritter et al. | |
| 2006/0294499 A1* | 12/2006 | Shim | G06F 9/44 717/107 |

(Continued)

OTHER PUBLICATIONS

U.S. Appl. No. 13/908,620, filed Jun. 3, 2013, Ritter et al.

(Continued)

*Primary Examiner* — Wynuel S Aquino
(74) *Attorney, Agent, or Firm* — Fish & Richardson P.C.

(57) ABSTRACT

The present disclosure describes methods, systems, and computer program products for data-centric integration modeling in an application integration system. One computer-implemented method includes receiving, by operation of an integration system, a logic integration program comprising a plurality of logic integration patterns that are defined in a data-centric logic integration language; generating a logical model graph based on the logic integration program, the logical model graph being runtime-independent; converting the logical model graph into a physical model graph, the physical model graph being runtime-specific; and generating logic integration runtime codes executable by the integration system based on the physical model graph.

14 Claims, 17 Drawing Sheets

(56) References Cited

U.S. PATENT DOCUMENTS

| | | | |
|---|---|---|---|
| 2009/0164197 A1* | 6/2009 | Matthews | G06F 30/394 |
| | | | 703/15 |
| 2011/0225571 A1 | 9/2011 | Stanford-Jason et al. | |
| 2012/0089534 A1 | 4/2012 | Liebig et al. | |
| 2013/0151463 A1 | 6/2013 | Ritter et al. | |
| 2013/0191306 A1* | 7/2013 | Wilkinson | G06Q 10/10 |
| | | | 705/348 |
| 2014/0068635 A1 | 3/2014 | Holzleitner et al. | |
| 2014/0359554 A1 | 12/2014 | Ritter et al. | |
| 2014/0372428 A1 | 12/2014 | Mathis et al. | |
| 2014/0372488 A1 | 12/2014 | Ritter et al. | |
| 2015/0169544 A1* | 6/2015 | Bufe, III | G06N 5/02 |
| | | | 704/9 |
| 2015/0293946 A1* | 10/2015 | Fong | G06F 16/288 |
| | | | 707/811 |
| 2016/0147510 A1 | 5/2016 | Simitsis et al. | |
| 2016/0154634 A1 | 6/2016 | Simitsis et al. | |

OTHER PUBLICATIONS

U.S. Appl. No. 13/916,889, filed Jun. 13, 2013, Mathis, et al.
U.S. Appl. No. 13/916,911, filed Jun. 13, 2013, Ritter et al.
U.S. Appl. No. 14/335,502, filed Jul. 18, 2014, Ritter et al.
U.S. Appl. No. 14/458,824, filed Aug. 13, 2014, Ritter et al.

* cited by examiner

```
300 ─┐
310 ─┤ @from(file:gameEvents.json,json)
     │ {gE(period,time,eventCode,pId).}

320 ─┤ g(period,time,pId):-
     │   gE(period,time,"Goal",pId).

330 ─┤ p (period,time,pId):-
     │   gE(period,time,"BallReception",pId).

340 ─┤ gByP(period,time,firstN,lastN):-
     │   g(period,time,pId),pInfo(pId,firstN,lastN).

350 ─┤ pAtB(period,time,firstN,lastN):-
     │   br(period,time,pId),pInfo(pId,firstN,lastN).

360 ─┤ @enrich(playerInfo.json,json)
     │ {pInfo(pId,firstN,lastN).}

370 ─┤ @to(twitter:$config,json)
     │ {gByP}
380 ─┤ @to(file:playersAtBall.json)
     │ {pAtB}
```

FIG. 3

```
@from(file:gameEvents.json,json)
{gE(period,time,eventCode,pId).}

@from(file:playerPosition.json,json)
{pPos(period,time,playerId,posX,posY).} g(period,time,pId):-gE(period,time,"Goal",pId).
p(period,time,pId):-gE(period,time,"
    BallReception",pId).

gByP(period,time,pId,firstN,lastN):-g(period,
    time,pId),pInfo(pId,firstN,lastN).
pAtB(period,time,pId,firstN,lastN):-p(period,
    time,pId),pInfo(pId,firstN,lastN).

posAtShotOnGoal(period,time,firstN,lastN,posX,
    posY):-gByP(period,time,pId,firstN,lastN),
    pPos(period,time,pId,posX,posY).

pPosPerMinute(period,time,playerId,posX,posY):-
    pPos(period,millitime,posX,posY),time:=1,
    time=millitime/600.
pPosPerMinute(period,time,playerId,posX,posY):-
    pPos(period,millitime,posX,posY),
    pPosPerMinute(A,previousTime,B,C,D),time:=
    previousTime+1,time=millitime/600.

@enrich(playerInfo.json,json)
{pInfo(pId,firstN,last).}

@to(twitter:$config,json)
{gByP}

@to(file:playersAtBall.json)
{pAtB}

@to{file:positionAtShotOnGoal}
{posAtShotOnGoal}

@to{jdbc:soccerDatabase}
{pPosPerMinute}
```

1000 → (annotation for code block)

FIG. 10

DATA-CENTRIC INTEGRATION MODELING

CLAIM OF PRIORITY

This application claims priority under 35 USC § 120 to U.S. patent application Ser. No. 14/665,825, filed on Mar. 23, 2015, the entire contents of which are hereby incorporated by reference.

BACKGROUND

The present disclosure relates to application integration modeling in an integration system, particularly for data-intensive application integrations.

Application integration is a process of linking multiple business applications (e.g., supply chain management applications, enterprise resource planning (ERP) systems, customer relationship management (CRM) applications, business intelligence applications, payroll and human resources systems, etc.) together to simplify and automate business processes. An integration system can include a number of logic integration patterns (also referred to as integration logic or integration logic programs) that form an integration process that operate on, for example, messages of applications. For example, messages can be sent and received by integration adapters that provide applications (e.g., business applications) with access to an integration process.

Conventional modeling of message-based integration (e.g., business application integration) scenarios is exclusively control-flow-centric, for example, by defining a control flow including a series of enterprise integration pattern (EIP) Icon Notations, although message-based integration is mainly about message routing and transformations that are based on the data/content of a message. The conventional integration modeling underspecifies the data flow and can be deficient especially for data-intensive application integrations.

SUMMARY

The disclosure generally describes computer-implemented methods, software, and systems for data-centric integration modeling. One computer-implemented method includes receiving, by operation of an integration system, a logic integration program comprising a plurality of logic integration patterns that are defined in a data-centric logic integration language; generating a logical model graph based on the logic integration program, the logical model graph being runtime-independent; converting the logical model graph into a physical model graph, the physical model graph being runtime-specific; and generating logic integration runtime codes executable by the integration system based on the physical model graph.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes (or causes the system) to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination.

A first aspect, combinable with the general implementation, further comprising defining the logic integration program using the data-centric logic integration language for declarative integration programming.

A second aspect, combinable with any of the previous aspects, wherein defining a logic integration program comprises: analyzing integration logic represented by the logical model graph; and adding integration artifacts.

A third aspect, combinable with any of the previous aspects, wherein the logical model graph comprises one or more annotations defined by the data-centric logic integration language as one or more nodes of the logical model graph.

A fourth aspect, combinable with any of the previous aspects, wherein the logical model graph comprises no cycles.

A fifth third aspect, combinable with any of the previous aspects, wherein converting the logical model graph into the physical model graph comprises: detecting patterns on the logical model graph; and performing a rule-based transformation of the patterns on the logical model graph; and mapping into implementation-specific messaging channels.

A sixth aspect, combinable with any of the previous aspects, further comprising optimizing the logical model graph.

The subject matter described in this specification can be implemented in particular implementations so as to realize one or more of the following advantages. Example techniques for declarative, data-centric integration scenario modeling are provided, which allows for automatic optimization of scenarios by combining optimizations from both data management domain and integration control domain (e.g., data partitioning, parallelization, scatter/gather, splitter/gather). The example modeling is an integration domain-specific language (DSL) grounded on data-centric languages and can be implemented in any relational logic languages, such as PROLOG, DATALOG, or XML- or JSON-based languages. An annotation dialect for integration artifacts (e.g., sender/receiver adapter, aggregate, split) that cannot be automatically derived from the data dependencies (e.g., Abstract Syntax Tree (AST)) can be added to integration rules (e.g., DATALOG rules) to attach integration semantics. The example techniques can semantically extend integration programs and build an AST based on the actual pieces of data, data operations, and (integration-specific) annotations (e.g., as nodes) and their interdependencies (e.g., as edges). The techniques allow declaratively describing "what" shall be the result, instead the usual, imperative "how to get there", thus making the approach more intuitive, lowering the learning curve, and requiring less technical knowledge. The example techniques allow defining a rule-based (traversal) approach on the data AST that derives basic integration patterns like message transformations, content-based routing, message filters, and inline content enriching. The rule-based techniques allow specifying match/execute conditions that are used to apply optimizations on the graph, such as AST analysis (e.g., unnecessary operations), independent data/operations (e.g., parallelization), and data partitioning. The (optimized) AST can be rewritten to a runtime-near message route graph using graph transformation. The graph can be used to generate integration runtime or intermediate code (e.g., DATALOG Blocks constructs). Apart from some optimizations, the transformations can be bijective, thus allowing for runtime monitoring up to the original language constructs (i.e., linking the actual runtime with the integration syntax/user interface (UI)). When leveraging the runtime feedback, this allows for debugging of integration constructs/programs.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 3 is a listing of an example logical integration language (LiLa) program of the application integration scenario of FIG. 2 according to an implementation.

FIG. 10 is a listing of an example extended LiLa program 1000 of the application integration scenario of FIG. 2 according to an implementation.

Like reference numbers and designations in the various drawings indicate like elements.

DETAILED DESCRIPTION

The following description is presented to enable any person skilled in the art to make and use the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

This disclosure generally describes computer-implemented methods, software, and systems for data-centric integration modeling in an application integration system. Particularly, a rule-based language for application integration, referred to as Logic Integration Language (LiLa), is provided, which defines integration logic tailored for more data-intensive processing. With the more data-centric integration language and a relational logic-based implementation of integration semantics, example data-centric integration modeling techniques are provided that allow for optimization from the data management domain (e.g., data partitioning, parallelization) to be combined with common integration processing (e.g., scatter/gather, splitter/gather). As such, the example data-centric integration modeling enables a more explicit data flow (including, e.g., data formats/models, operations/processing) that can be specified and derived from the integration scenario models. The data flow can be more easily perceived and adapted, improving clarity and flexibility of integration scenario description and facilitating understanding and control of system's behaviors (e.g., which data and how it is processed).

The example data-centric integration modeling techniques allow automated optimizations of the data flow and control flow, for example, by the integration system, as an alternative or in addition to manual optimizations, for example, by integration experts following best-practices guidelines, such as using scatter/gather pattern, where applicable. In some implementations, the example data-centric integration modeling techniques can use the control flow as a constraint to design, adapt, optimize, or otherwise modify the data flow. In some implementations, the example data-centric integration modeling techniques can achieve optimal control-flow and data-flow modeling that is not feasible by manual optimizations. The example data-centric integration modeling techniques can allow resource-efficient processing (e.g., green/energy efficient processing) and improve system performances by optimizing the control-flow and data-flow, reducing redundancy, and enabling parallel processing.

Figure 1A:
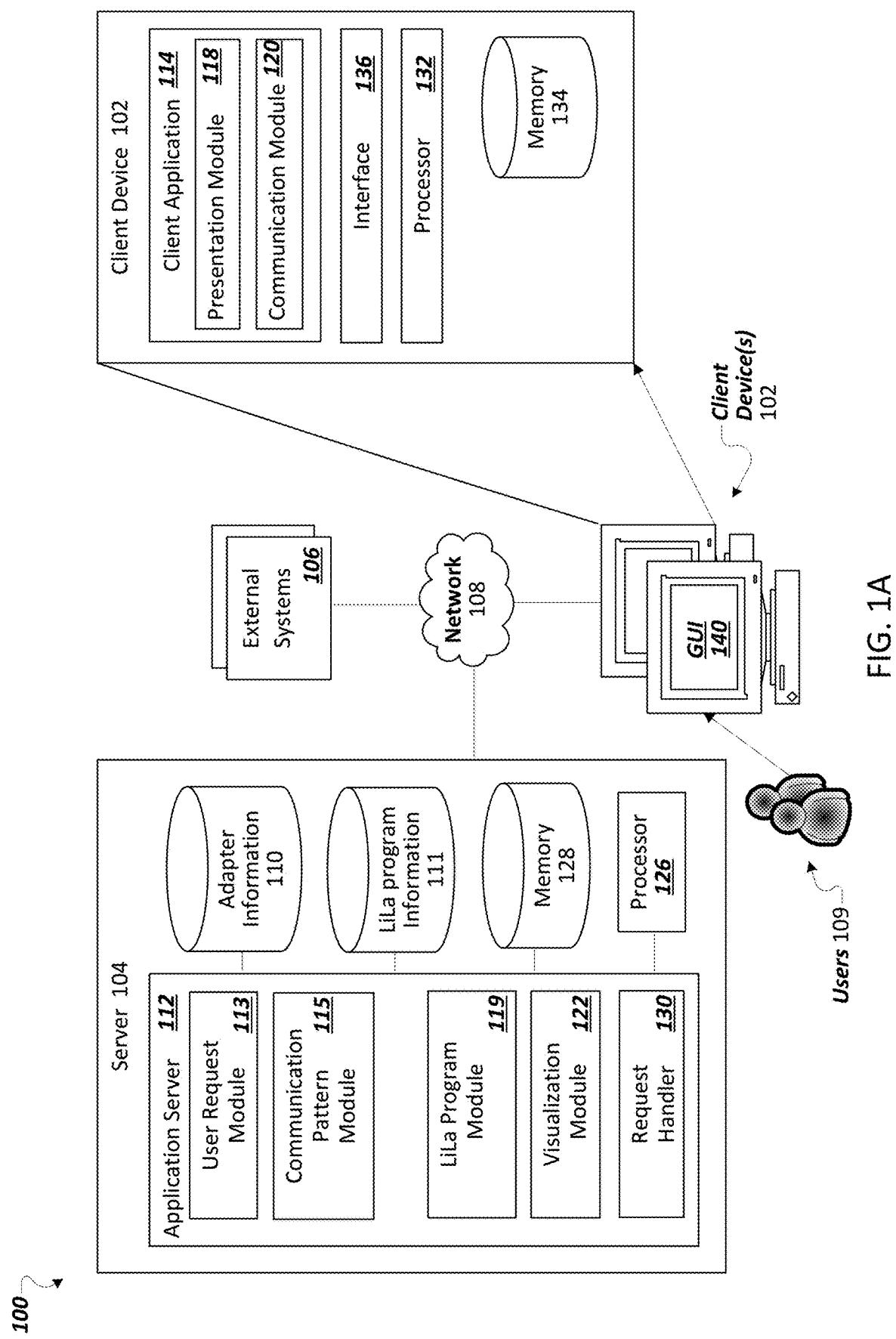
FIG. 1A is a block diagram of an example environment for application integration modeling according to an implementation.

FIG. 1A is a block diagram of an example environment 100 for data-centric integration modeling. Specifically, the illustrated environment 100 can be an application integration system 100 that includes, or is communicably coupled with, plural client devices 102, a server 104, and one or more external systems 106, connected using a network 108. For example, the environment 100 can be used to present information on the plural client devices 102 using information available from the server 104. Further, input can be received from users 109 on the plural client devices 102 for analysis by the server 104.

At a high level, the server 104 comprises an electronic computing device operable to collect, store, and provide access to information for use by the client device 102. A data store of adapter information 110, for example, can include information received from the plural client devices 102. For example, users 109 can provide specific information for an adapter that the server 104 can use to characterize the adapter. The adapter information 110 can also include information maintained by the server 104 for use in characterizing adapters using information received from user inputs. The application server 112 can include a data store of LiLa program information 111. For example, the LiLa program information that is stored can provide types, rules, syntax, semantics, and other properties of LiLa programs or patterns described below with reference to FIGS. 2-13.

As used in the present disclosure, the term "computer" is intended to encompass any suitable processing device. For example, although FIG. 1A illustrates a single server 104, the environment 100 can be implemented using two or more servers 104, as well as computers other than servers, including a server pool. Indeed, the server 104 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 104 may be adapted to execute any operating system, including Linux, UNIX, Windows, Mac OS®, Java™, Android™, iOS or any other suitable operating system. According to some implementations, the server 104 may also include, or be communicably coupled with, an e-mail server, a web server, a caching server, a streaming data server, and/or other suitable server(s). In some implementations, components of the server 104 may be distributed in different locations and coupled using the network 108.

In some implementations, the server 104 includes an application server 112 that performs processing at the server 104 that is needed to support requests for data and analysis of information received from the client device 102. For example, the application server 112 can receive adapter-related information and inputs from the client device 102. Further, the application server 112 can use the received information to characterize an adapter as having characteristics, as described below with reference to FIGS. 2-13.

The application server 112 includes a user request module 113, for example, that can receive, from the client device 102, adapter-related information associated with an adapter. For example, the information received can be information provided by the user in a client application 114, such as a front end for inputting adapter-related information used to characterize a specific adapter. The user request module 113 can also prepare data that is to be presented by a presentation module 118 at the client device 102. For example, the user request module 113 can prepare data for presentation based on user inputs received by a communication module 120. The inputs, for example, can include user inputs for specifying particular information associated with an adapter. The user request module 113 can also be used by the server 104 for communicating with other systems in a distributed environment, connected to the network 108 (e.g., the client device 102), as well as other systems (not illustrated) communicably coupled to the network 108. Generally, the user request module 113 comprises logic encoded in software and/or hardware in a suitable combination and operable to communicate with the network 108. More specifically, the user request module 113 may comprise software supporting one or more communication protocols associated with communications such that the network 108 or interface's hardware is operable to communicate physical signals within and outside of the illustrated environment 100.

The application server 112 further includes a communication pattern module 115 for determining communication patterns associated with an adapter. For example, determining communication patterns can include identifying communication styles and bridges for a given adapter and determining one or more processing patterns, as described below with reference to FIGS. 2-13.

The application server 112 further includes a LiLa program module 119. For example, LiLa program module 119 can define, configure, optimize, convert, or otherwise manage a LiLa program according to example techniques described below with reference to FIGS. 2-13.

The application server 112 further includes a visualization module 122. As an example, the visualization module 122 can generate instructions so that a visualization for a LiLa dependency graph (LDG) or a route graph (RG) can be displayed on the client device 102. For example, the visualization can match one of the visualizations shown in FIGS. 2-13.

The server 104 further includes a processor 126 and memory 128. Although illustrated as the single processor 126 in FIG. 1A, two or more processors 126 may be used according to particular needs, desires, or particular implementations of the environment 100. Each processor 126 may be a central processing unit (CPU), an application specific integrated circuit (ASIC), a field-programmable gate array (FPGA), or another suitable component. Generally, the processor 132 executes instructions and manipulates data to perform the operations of the client device 102. Specifically, the processor 126 executes the functionality required to receive and process requests from the client device 102 and analyze information received from the client device 102.

The memory 128 (or multiple memories 128) may include any type of memory or database module and may take the form of volatile and/or non-volatile memory including, without limitation, magnetic media, optical media, random access memory (RAM), read-only memory (ROM), removable media, or any other suitable local or remote memory component. The memory 128 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 104. In some implementations, memory 128 includes one or more of the adapter information 110 and the data store of LiLa program information 111. Other components within the memory 128 are possible.

Each client device 102 of the environment 100 may be any computing device operable to connect to, or communicate with, at least the server 104 via the network 108 using a wireline or wireless connection. In general, the client device 102 comprises an electronic computer device operable to receive, transmit, process, and store any appropriate data associated with the environment 100 of FIG. 1A.

A request handler 130, e.g., included in the application server 112, can receive inputs and handle requests received from the client device 102. Specifically, the request handler 130 can receive user inputs, including LiLa program information, entered by the user 109 on the client application 114. In some implementations, the request handler 130 can also process requests received from other sources in addition to client devices 102, e.g., requests received from external systems 106.

The illustrated client device 102 further includes a processor 132, a memory 134, and an interface 136. The interface 136 is used by the client device 102 for communicating with other systems in a distributed environment—including within the environment 100—connected to the network 108, e.g., the server 104, as well as other systems communicably coupled to the network 108 (not illustrated). Generally, the interface 136 comprises logic encoded in software and/or hardware in a suitable combination and operable to communicate with the network 108. More specifically, the interface 136 may comprise software supporting one or more communication protocols associated with communications such that the network 108 or interface's hardware is operable to communicate physical signals within and outside of the illustrated environment 100.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1A are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As illustrated in FIG. 1A, the client device 102 includes the processor 132. Although illustrated as the single processor 132 in FIG. 1A, two or more processors 132 may be used according to particular needs, desires, or particular implementations of the environment 100. Each processor 132 may be a central processing unit (CPU), an application specific integrated circuit (ASIC), a field-programmable gate array (FPGA), or another suitable component. Generally, the processor 132 executes instructions and manipulates data to perform the operations of the client device 102. Specifically, the processor 132 executes the functionality required to send requests to the server 104 and to receive and process responses from the server 104.

The illustrated client device 102 also includes a memory 134, or multiple memories 134. The memory 134 may include any memory or database module and may take the form of volatile or non-volatile memory including, without limitation, magnetic media, optical media, random access memory (RAM), read-only memory (ROM), removable media, or any other suitable local or remote memory component. The memory 134 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 102.

The illustrated client device 102 is intended to encompass any computing device such as a smart phone, tablet computing device, PDA, desktop computer, laptop/notebook computer, wireless data port, one or more processors within these devices, or any other suitable processing device. For example, the client device 102 may comprise a computer that includes an input device, such as a keypad, touch screen, or other device that can accept user information, and an output device that conveys information associated with the operation of the server 104 or the client device 102 itself, including digital data, visual information, or a graphical user interface (GUI) 140, as shown with respect to and included by the client device 102. The GUI 140 interfaces with at least a portion of the environment 100 for any suitable purpose, including generating user interface screens that support user input of adapter-related information and display visualizations of adapters using information received from the server 104.

Figure 1B:
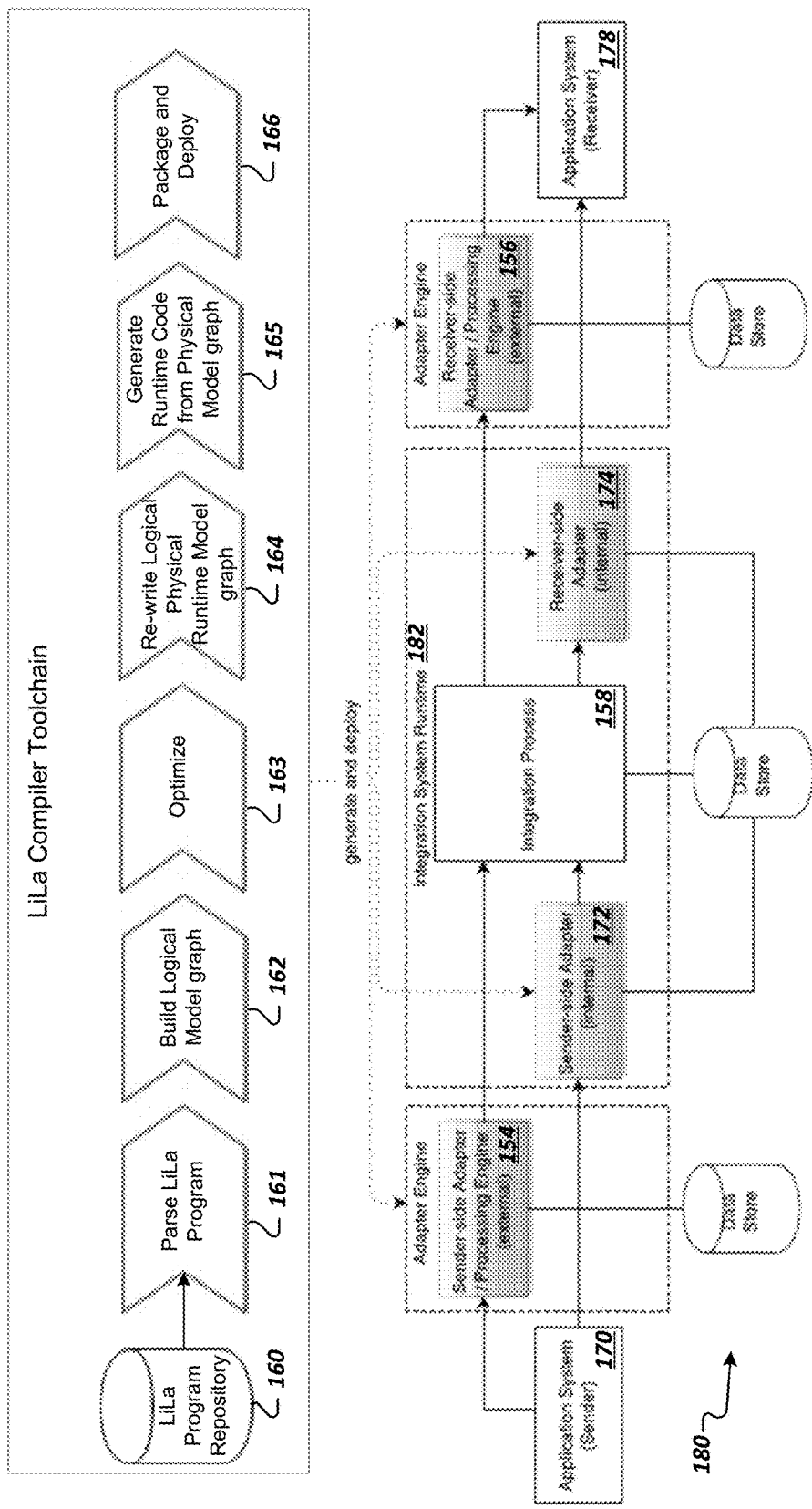
FIG. 1B is a diagram of an example integration process flow according to an implementation.

FIG. 1B is a diagram of an example integration process flow 150. In some implementations, the integration process flow 150 includes an adapter process flow and can involve operations associated with a LiLa compiler toolchain 152, adapters 154 and 156, and an integration process 158. Processing among the adapters 154 and 156, and an integration process 158 can include information sent by an application system 170 (e.g., a sender), a sender-side adapter 172, a receiver-side adapter 174, and a receiver application system 178. Other processing is possible. The processing can make use of information stores in data stores 180 used by the adapters.

In some implementations, the LiLa compiler toolchain 152 includes various steps for compiling LiLa programs into programs or routes executable by the integration system runtime 182. For example, if APACHE CAMEL is used as the integration system runtime 182, the LiLa programs can be complied into message channels in APACHE CAMEL, namely, CAMEL Routes, based on the example rule-based, graph transformation toolchain or method flow 152.

For example, a step 161 can parse LiLa programs. At step 162, for example, the parsed and identified LiLa programs are translated into a logical model graph, such as LiLa dependency graph (LDG), for example, according to example techniques described below with respect to FIG. 4. A step 163 can perform rule- and cost-based optimizations on the logical model graph, for example, to remove redundancy or cycles in the logical model graph. At step 164, a rule-based pattern detection can be performed to identify patterns in the logical model graph and re-write the logical model graph into a physical runtime model graph. For example, the LDG can be bi-directionally transformed to a general message channel (or route) graph, according to example techniques described below with respect to FIG. 5. A step 165, for example, can generate runtime code (e.g., CAMEL routes in APACHE CAMEL runtime system) based on the physical runtime model graph. A step 166, for example, can package and deploy the generated runtime code. The LiLa compiler toolchain 152 can use LiLa program information in a LiLa registry 160, e.g., that includes information associated with definitions and characteristics of different LiLa program types. The LiLa compiler toolchain 152 includes processing, for example, that supports steps in the method process described below with respect to FIG. 13.

Integration semantics can be described based on a comprehensive (often graphically depicted) syntax and execution semantics (e.g., process model). Some implementations can collect a widely used and accepted collection of integration patterns that are typical concepts used when implementing a messaging system and have proven to be useful in practice. However, the implementations may not specify a semantic model for the formalization of the integration syntax and semantics. Most noticeable, the integration adapter modeling with its manifold characteristics can be reduced to a channel adapter icon in the figure.

In some implementations, a domain-specific language (DSL) can be studied and provided with well-defined building blocks for modeling enterprise integration patterns (EIPs) in the Business Process Model and Notation (BPMN), which is typically considered a "de-facto" standard for modeling business process semantics and their runtime behavior. EIPs can be mapped to BPMN-compatible syntax and defined execution semantics adapted to message processing. The use of EIPs can be extended to end-to-end flows of messages, called integration flows (IFlows). An IFlow can be considered as message-based integration from a sending application (e.g., sender, BPMN participant) to one or many receiving applications (e.g., receiver(s), BPMN participants). The message-based integration can use BPMN message flow configurations (e.g., denoting the inbound and outbound adapters) and dedicated participant(s) that specify an integration process (composition of EIPs). In some implementations, BPMN can be used for defining a "message-based integration" DSL due to its sufficient coverage of control flow, data/exception flow, process modeling capabilities, and execution semantics. Current work in the area of data in business processes, for example, includes configuration-based release processes (COREPRO), which mainly deals with data-driven process modeling, (business) object status management, and UML activity diagrams. However, BPMN can achieve higher coverage in the categories relevant for the approach. As will be appreciated by those of ordinary skill in the art, other design artifacts and modeling methodologies instead of or in addition to EIPs and BPMN can be used.

Figure 2:
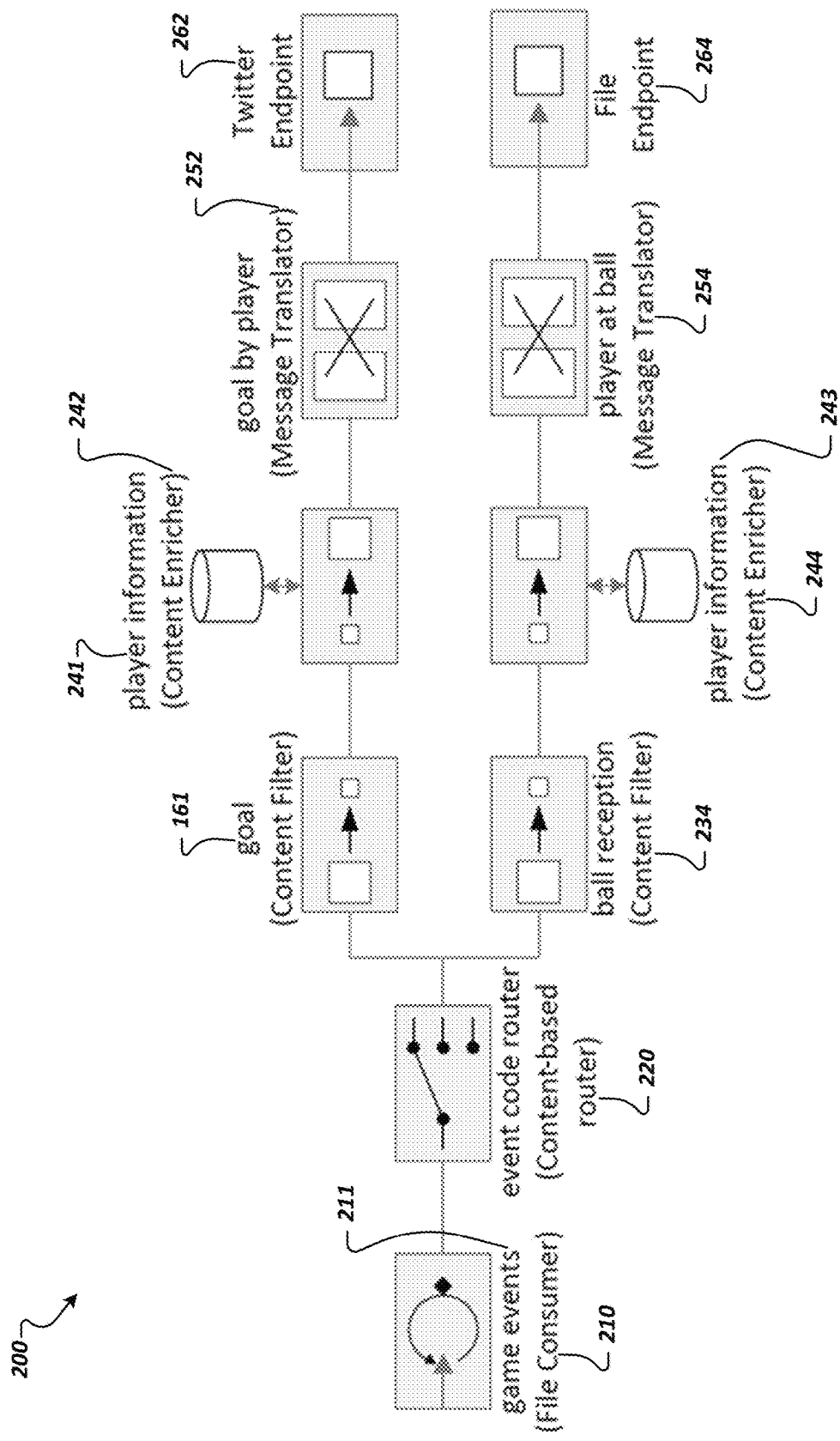
FIG. 2 is a diagram of an example data-intensive application integration scenario according to an implementation.

FIG. 2 is a diagram of an example data-intensive application integration scenario 200 according to an implementation. Specifically, the data-intensive application integration scenario 200 includes a "Soccer Player Event" integration scenario from sports management in the EIP icon notation. Additional or different integration scenarios are possible.

In an example, FIG. 2 shows that player event data is gained through a File/Polling Consumer 210, loading game events 211 collected by sensors attached to the players and the playing field during a soccer match. Depending on the event code, a Content-based Router pattern 230 is used to route the messages to specific filter operations for "Shots on goal" and "Player at ball" through Content Filters 232 and 234, respectively. Additional player information 241 and 243 can be merged into the resulting messages using Content Enrichers 242 and 244 for "Shots on goal" and "Player at ball," respectively. Then, the messages are converted into the formats understood by their receivers using Message Translators 252 and 254 accordingly. The "Shots on goal" information can be posted as twitter feed, represented by a Twitter endpoint 262, and ball possession information can be stored to file, represented by a file endpoint 264.

The multiple integration patterns (e.g., the File/Polling Consumer 210, Content-based Router pattern 230, Content Filters 232 and 234, Content Enrichers 242 and 244, Message Translators 252 and 254) model a control flow. The message formats (e.g., "Game events" 211, "Player information" 241 and 243) and the actual data processing (e.g., routing and filter conditions, enricher and mapping programs) remain hidden on a second level configuration.

In some implementations, a more data-aware formalization is desirable that treats data as a first-level configuration of an integration scenario. Such a data-centric presentation can give an integration expert immediate control over the core aspect of integration, the data, and its format. The data-centric presentation can reduce or eliminate the burden of explicitly modeling the system's control flow and allow automatic configuration and optimization by the system itself, while keeping the options of manual best practices and optimizations.

Logic Integration Language (LiLa) provides an example data-centric modeling approach and formalization tailored to data-intensive, message-based integration. In some implementations, DATALOG can be used to re-define core EIPs as part of a conventional integration system. DATALOG allows for data processing closer to its storage representation, and can be sufficiently expressive for the evaluation of EIPs. LiLa programs can be based on standard DATALOG+. Example integration-specific extensions can be defined.

FIG. 3 is a listing 300 of an example LiLa program of the soccer game event integration scenario of FIG. 2 according to an implementation. In this example, data flow, formats, and operations are represented as DATALOG program with annotations. Listing 300 shows a file-based message adapter @from 310 that reads a stream of game events in the JSON format, canonically converts and projects the message body to DATALOG facts of the form gE. Several DATALOG rules represent operations on the data-like filters (e.g., predicates g 320, p 330), enricher @enrich 360, that loads and merges pInfo from gByP 340 and pByB 350), before binding the intentional database (IDB) (i.e., relation defined by one or more rules) relations to receiver endpoints @to 370 and 380 that only pass specified predicates and (canonically) convert them to the configured format (e.g., JSON).

In some implementations, based on the LiLa programs (e.g., the example LiLa program 300), integration semantics and an efficient control flow can be derived using pattern detection. In some implementations, LiLa programs can be synthesized and implemented in integration system runtimes, for example, the open-source integration system APACHE CAMEL that implements most of the integration semantics in the form of EIPs. In some instances, the usage of a more data-centric message processing is especially promising, for example, for message transformations, while the routing efficiency remains similar to the conventional processing, and from an end-to-end messaging point of view. Furthermore, the data-centric modeling with LiLa leverages the potential for optimizations and better modeling clarity compared to the existing control flow-centric languages.

The Enterprise Integration Patterns (EIPs) define operations on the header (i.e., payload's meta-data) and body (i.e., message payload) of a message, which are normally implemented in the integration system host language (e.g., JAVA, C#). Therefore, the actual integration operation (e.g., the content developed by an integration expert like mapping programs and routing conditions) can be differentiated from the implementation of the runtime system that evaluates the content operations and processes their results. In some implementations, the content operations can be refined using DATALOG, leaving the runtime system (implementation) as is. The resulting set of operations and integration language additions, which can be referred to as Integration Logic Programming (ILP), targets an enhancement of conventional integration systems for data-intensive processing, while preserving the general integration semantics like Quality of Service (e.g., best effort, exactly once) and the Message Exchange Pattern (e.g., one-way, two-way). In other words, the content part for the patterns can be evaluated by a DATALOG system, which is invoked by an integration system that processes the results.

Canonical Data Model

In some implementations, for example, when connecting applications, various operations are executed on the transferred messages in a uniform way. The arriving messages are converted into an internal format understood by the pattern implementation, called Canonical Data Model (CDM), before the messages are transformed to the target format. Hence, if a new application is added to the integration solution, only conversions between the CDM and the application format have to be created. Consequently, for the re-definition of integration patterns, we define a CDM as DATALOG Program, which consists of a set of facts, with an optional set of (supporting) rules as message body and a set of meta-facts that describes the actual data as header. The meta-facts encode the name of the fact's predicate and all parameter names within the relation as well as the position of each parameter. With that information, parameters can be accessed by name instead of position by DATALOG rules (e.g., for selections, projections).

Relational Logic Integration Patterns

Some example DATALOG operations include join, projection, union, and selection. The join of two relations r(x,y) and s(y,z) on parameter y is encoded as j(x,y,z)←r(x,y),s(y,z), which projects all three parameters to the resulting predicate j. More explicitly, a projection on parameter x of relation r(x,y) is encoded as p(x)←r(x,y). The union of r(x,y) and s(x,y) is u(x,y)←r(x,y). u(x,y)←s(x,y), which combines several relations to one. The selection r(x,y) according to a built-in predicate φ(x,[const|z]) is encoded as s(x,y)←r(x,y),φ(x,[const|z]), which only returns s(x,y) records for which φ(x,[const|z]) evaluates to true for a given constant value const or a variable value z. Built-in predicates can be numerical, binary relations φ(x,const) like <,>,<=,>=,= as well as string, binary relations like equals, contains, startswith, endswith, numerical expressions based on binary operators like =,+,−,*,/(e.g., x=p(y)+1) and operations on relations like y=max(p(x)),y=min(p(x)), which would assign the maximal or the minimal value of a predicate p to a parameter y.

In some implementations, the example techniques allow each single pattern definition to evaluate arbitrary DATALOG rules, queries, and built-in predicates. In some implementations, the example techniques allow the DATALOG to perform pattern mapping to identify and focus on the most relevant DATALOG operations for a specific pattern.

Message Routing Patterns.

The routing patterns can be seen as control and data flow definitions of an integration channel pipeline. The routing patterns can access the message to route it within the integration system and eventually to its receiver(s), and can influence the channel and message cardinality as well as the content of the message. The most common routing pattern that determines the message's route based on its body is the Content-based Router. The stateless router has a channel cardinality of 1:n, where n is the number of leaving channels, while one channel enters the router, and a message cardinality of 1:1. The entering message constitutes the leaving message according to the evaluation of a routing condition. This condition is a function rc, with $\{out_1, out_2, \ldots, out_n\}$=rc(msg$_{in}$.body.x,conds), where msg$_{in}$ determines the entering message and body.x is an arbitrary field x of its structure. The function rc evaluates to a list of Boolean output on a list of conditions conds for each leaving channel. The output $\{out_1, out_2, \ldots, out_n\}$ is a set of Boolean values for each of the n ∈ N leaving channels.

In some instances, only one channel must be evaluated to true, all others to false. The Boolean output determines on which leaving channel the message is routed further (i.e., exactly one channel will route the message). Common integration systems implement a routing function that provides the entering message msg$_{in}$, represented by a DATALOG program (e.g., mostly facts) and the conds configurations as DATALOG rules. Since standard DATALOG rules cannot directly produce a Boolean result, there are at least two ways of re-defining rc: (a) by a supporting function in the integration system, or (b) by adding Boolean DATALOG facts for each leaving channel that are joined with the evaluated conditions and exclusively returned by projection (not further discussed). An additional function help rc for option (a) could be defined as $\{out_1, out_2, \ldots, out_n\}$=help rc(list(list(fact))), fitting to the input of the routing function, where list(list(fact)) describes the resulting facts of the evaluation of conds for each channel. The function help rc emits true, if and only if list(facts) 6=∅, and false otherwise. In some implementations, the ILP routing condition is defined as list(fact)=ilp$_{rc}$(msg$_{in}$.body.x,conds), while being evaluated for each channel condition, thus generating list (list(fact)). The conds would then mainly be DATALOG operations like selection or built-in predicates. For the message filter, which is a special case of the router that distinguishes only in its channel cardinality of 1:1 and the resulting message cardinality of 1:[0|1], the ilp$_{rc}$ would have to be evaluated once.

By contrast, the stateless Multicast and Recipient List patterns route multiple messages to leaving channels, which gives them a message and channel cardinality of 1:n. While the multicast routes messages statically to the leaving channels, the recipient list determines the receiving channels dynamically. The receiver determination function rd, with $\{out_1, out_2, \ldots, out_n\}$=rd(msg$_{in}$.[header.y|body.x])., computes n ∈ N receiver channel configurations $\{out_1, out_2, \ldots, out_n\}$ by extracting their key values either from an arbitrary message header field y or from the body x field of the message. In some implementations, the integration system has to implement a receiver determination function that takes the list of key-strings $\{out_1, out_2, \ldots, out_n\}$ as input, for which it looks up receiver configurations recv$_i$, recv$_{i+1}$, \ldots, recv$_{i+m}$, where i,m,n ∈ N and m≤n, and passes copies of the entering message $\{msg'_{out}, msg''_{out}, \ldots, msg_{out}^m\}$. In terms of DATALOG, rd$_{ilp}$ is a projection from values of the message body or header to a unary, output relation. For instance, the receiver configuration keys recv$_1$ and recv$_2$ can be part of the message body like body(x', recv'$_1$), body(x', recv'$_2$). and rd$_{ilp}$ would evaluate a DATALOG rule similar to config(y)←body(x,y). For more dynamic receiver determinations, a dynamic routing pattern could be used. The example ILP definitions allow deviations from the original pattern and can extend the expressiveness of the recipient list. In some implementations, the multicast and join router patterns are statically configurable 1:n and n:1 channel patterns, which do not need a re-definition as ILP.

The antipodal Splitter and Aggregator patterns both have a channel cardinality of 1:1 and create new leaving messages. Therefore, the splitter breaks the entering message into multiple (smaller) messages (e.g., message cardinality of 1:n) and the aggregator combines multiple entering messages to one leaving message (e.g., message cardinality of n:1). To be able to receive multiple messages from different channels, a Join Router pattern with a channel cardinality of n:1 and message cardinality of 1:1 can be used as a predecessor to the aggregator. Thus, the stateless splitter uses a split condition sc, with $\{out1, out2, \ldots, outn\}$&=sc (msg$_{in}$.body,conds), which accesses the entering message's body to determine a list of distinct body parts $\{out_1, out_2, \ldots, out_n\}$, based on a list of conditions conds, that are each inserted to a list of individual, newly created leaving messages $\{msg_{out1}, msg_{out2}, \ldots, msg_{outn}\}$ with n ∈ N by a splitter function. The header and attachments are copied from the entering to each leaving message. The re-definition sc$_{ilp}$ of split condition sc evaluates a set of DATALOG rules as conds, which mostly use DATALOG selection and sometimes built-in and join constructs (the latter two are marked "light blue"). Each part of the body out$_i$ is a set of facts that is passed to a split function, which wraps each set into a single message.

The stateful aggregator defines a correlation condition, completion condition and an aggregation strategy. The correlation condition crc, with $coll_i=crc(msg_{in}.[header.y|body.x], conds)$, determines the aggregate collection $coll_i$, with $i \in N$, based on a set of conditions conds to which the message is stored. The completion condition cpc, with $cpout=cpc(msg_{in}.[header.y|body.x])$, evaluates to a Boolean output cpout based on header or body field information (similar to the message filter). If cpout==true, then the aggregation strategy as, with $aggout=as(msg_{in1}, msg_{in2}, \ldots, msg_{inn})$, is called by an implementation of the messaging system and executed; otherwise, the current message is added to the collection $coll_i$. The as evaluates the correlated entering message collection $coll_i$ and emits a new leaving message $msg_{out}$. For that, the messaging system has to implement an aggregation function that takes aggout (i.e., the output of as) as input. These three functions are re-defined as $crc_{ilp}$, $cpc_{ilp}$ such that the conds are rules mainly with selection and built-in DATALOG constructs. The $cpc_{ilp}$ makes use of the defined help rc function to map its evaluation result (i.e., list of facts or empty) to the Boolean value cpout. The aggregation strategy as is re-defined as $as_{ilp}$, which mainly uses DATALOG union to combine lists of facts from different messages. The message format remains the same. To transform the aggregates' formats, a message translator should be used to keep the patterns modular. However, the combination of the aggregation strategy with translation capabilities could lead to runtime optimizations.

Message Transformation Patterns

In some implementations, the transformation patterns exclusively target the content of the messages in terms of format conversations and modifications.

The stateless Message Translator changes the structure or format of the entering message without generating a new one (i.e., channel, message cardinality 1:1). For that, the translator computes the transformed structure by evaluating a mapping program mt, with $msg_{out}.body=mt(msg_{in}.body)$. Thus, the field content can be altered.

The related Content Filter and Content Enricher patterns can be subsumed by the general Content Modifier pattern and share the same characteristics as the translator pattern. The filter evaluates a filter function mt, which only filters out parts of the message structure, e.g., fields or values, and the enricher adds new fields or values as data to the existing content structure using an enricher program ep, with $msg_{out}.body=ep(msg_m.body,data)$.

The re-definition of the transformation function $mt_{ilp}$ for the message translator can use DATALOG join and projection (plus built-ins for numerical calculations and string operations, thus marked "light blue") and DATALOG selection, projection, and built-in (mainly numerical expressions and character operations) for the content filter. While projections allow for rather static, structural filtering, the built-in and selection operators can be used to filter more dynamically based on the content. The resulting DATALOG programs are passed as $msg_{out}.body$. In addition, the re-defined enricher program $ep_{ilp}$ can use DATALOG union operations to add additional data to the message as DATALOG programs.

Pattern Composition

The defined patterns can be composed to more complex integration programs (e.g., integration scenarios or pipelines). From the many combinations of patterns, two example structural patterns that are frequently used in integration scenarios are described below: (1) scatter/gather and (2) splitter/gather [12]. Both patterns can be supported by the patterns re-defined as ILPs.

The scatter/gather pattern (with a 1:n:1 channel cardinality) is a multicast or recipient list that copies messages to several statically or dynamically determined pipeline configurations, which each evaluate a sequence of patterns on the messages in parallel. Through a join router and an aggregator pattern, the messages are structurally and content-wise joined.

The splitter/gather pattern (with a 1:n:1 message cardinality) splits one message into multiple parts, which can be processed in parallel by a sequence of patterns. In contrast to the scatter/gather, the pattern sequence is the same for each instance. A subsequently configured aggregator combines the messages to one.

Logic Integration Language

In the context of data-intensive message-processing, conventional control flow-centric integration languages do not allow to design the data flow. Through the re-definition of the integration patterns with DATALOG as ILPs, a foundation for a data-centric definition of integration scenarios is provided. In some implementations, the language design of the subsequently defined Logic Integration Language (LiLa) is based on DATALOG, which specifies programs that carefully extend standard DATALOG+ by integration semantics using annotations for message endpoints and complex routing patterns. Additional or different relational logic languages can be used.

Table 1 shows an example format of an annotation in LiLa. The annotation includes a head with name preceded by "@" and zero or more parameters enclosed in brackets, as well as a body enclosed in curly brackets. Variations of the format can be contemplated.

TABLE 1

Format of an annotation in LiLa

@<annotationName>(<parameter>+)
{ <Annotation Body> }

Logic Integration Language Programs

In some implementations, a LiLa program defines dependencies between DATALOG facts, rules, and annotations that are similar to the dependency graph of a DATALOG program ("$DG_D$"). A cyclic dependency graph $DG_D$ of a (recursive) DATALOG program can be defined as $DG_D=(V_D,E_D)$, where the nodes $V_D$ of the graph are IDB predicates, and the edges $E_D$ are defined from a node $n_1 \in N$ (predicate 1) to a node $n_2 \in N$ (predicate 2), if and only if, there is a rule with predicate 1 in the head and predicate 2 in the body.

In some implementations, the directed, acyclic LiLa dependency graph ("LDG") can be defined as $LDG=(V_p, E_p)$, where $V_p$ are collections of IDB predicates (also be referred to as processors). An edge $E_p$ from processor $p_1 \in V_p$ to $p_2 \in V_p$ exists, if there is a rule with predicate 1 from $p_1$ in the head and predicate 2 from $p_2$ in the body. Hence, the LDG contains processors with embedded cyclic rule dependency graphs, which do not lead to cycles in the LDG. In contrast to the $DG_D$, annotations are added to the LDG as nodes. If an annotation uses a predicate, an edge from that predicate is drawn to the node of the annotation (i.e., annotation depends on that predicate). If another annotation or rule uses the predicates produced by an annotation, an edge from the annotation to the node representing the annotation or rule, which uses the data produced by the annotation, is drawn.

Figure 4:
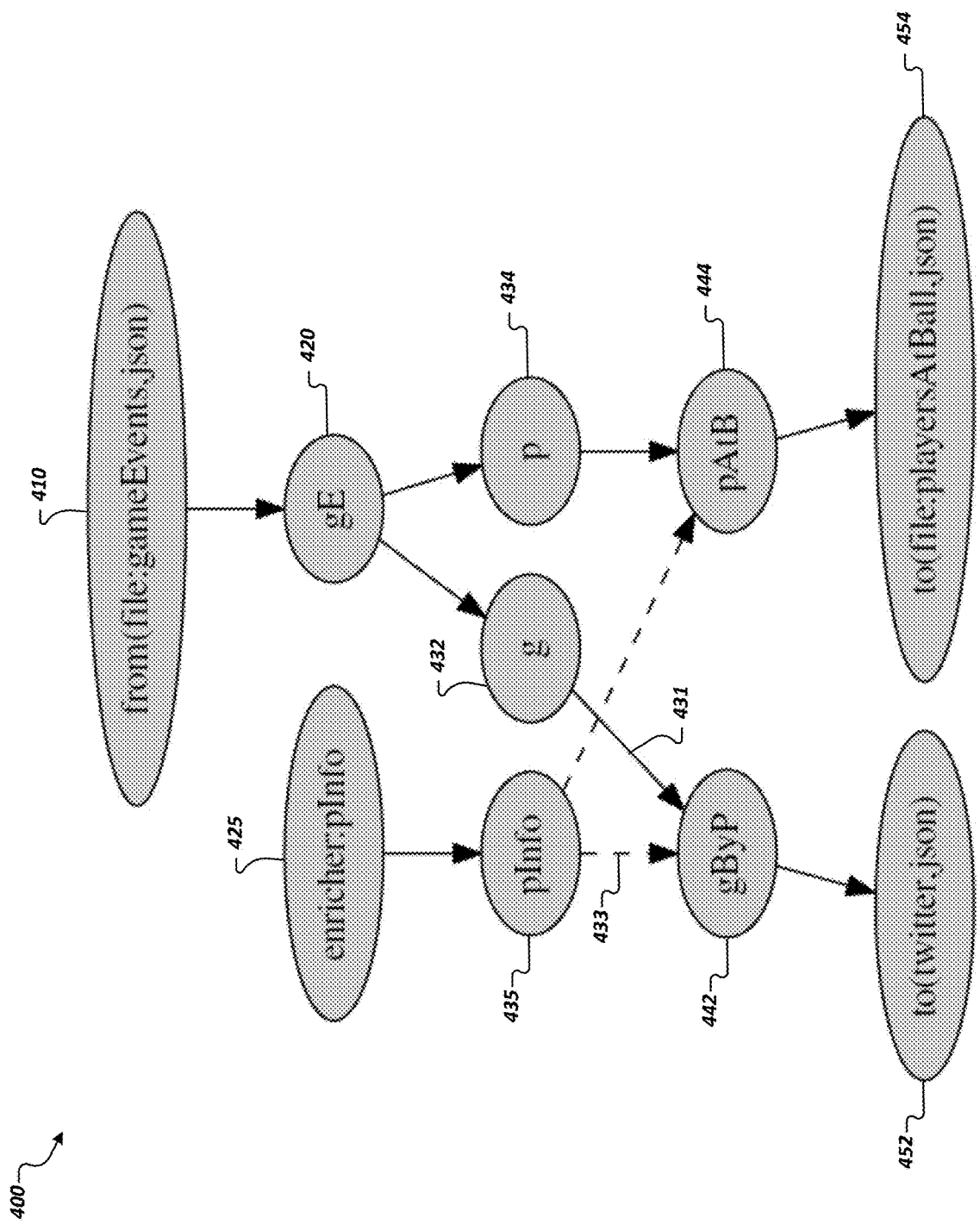
FIG. 4 is a diagram shows an example LiLa dependency graph (LDG) for the LiLa program of FIG. 3.

FIG. 4 is a diagram showing an example LiLa dependency graph ("LDG") 400 for the LiLa program depicted in Listing 300 of FIG. 3. For example, according to Listing 300, because the annotation or rule gByP 340 uses the predicates produced by annotations g 320 and pInfo 360, in the LDG 400, edges 431 and 433 from the annotations g 432 and pInfo 435 to the node gByP 442 are drawn, respectively, representing that the annotation gByP 442 uses the data produced by the annotations g 432 and pInfo 435. The message endpoint nodes 452 and 454 are labeled with their consumer/producer URI with the predicate name of the rule for content filters.

Endpoint-Specific Extensions

To connect the message sender, the Fact Source, with the message receiver, the Routing Goal, LiLa extends DATA-LOG by @from, @to annotation statements similar to the open source integration system APACHE CAMEL Nodes of LDG with no incoming edges are either extentional database (EDB) (e.g., relation stored in data or knowledge base) predicates or fact sources. Nodes with no outgoing edges are (mostly) routing goals. The only counter example are obsolete/unused processing steps, which can be deleted in some implementations.

Table 2 shows an example definition of a fact source in LiLa. In some implementations, the sender-facing fact source specifies the sender's transport and message protocol. The fact source definition in Table 2 includes a location configuration URI that can be directly interpreted by an integration system and defines the location of the facts and formats the message format of the data source (e.g., JSON, CSV, XML). The annotation body specifies the format's relations in the form of DATALOG facts. The message format can be canonically converted to DATALOG programs according to the ILP-CDM.

TABLE 2

Example definition of a fact source in LiLa

@from(<location>,<format>)
{ <relationName(<parameter>+)>.+ }

Table 3 shows an example definition of a routing goal in LiLa. In some implementations, the routing goal definitions can specify the receiver-facing transport and message protocols. Therefore, the ILP-CDM can be canonically converted to the message format understood by the receiver.

TABLE 3

Example definition of a routing goal in LiLa

@to(<producerURI>,<format>)
{ <relationName>[<linebreak><relationName>]* }

Inherent Integration Patterns

The DATALOG facts provided by the fact source can be directly evaluated by DATALOG rules. The LiLa dependency graph can be used to automatically identify, for example, message transformation and basic routing patterns.

Message Transformation Patterns.

Example message transformation patterns that can be derived from the LDG include Content Filter, Message Translator, and the local Content Enricher.

The content filter and message translator patterns are used to filter parts of a message as well as to translate the message's structure. Both can be inherently declared in LiLa by using DATALOG rules, which are collected in processors of the LDG. Each set of rules producing the same predicate corresponds to a filter or translator in the integration middleware. For instance, the LiLa program 300 in FIG. 3 for the soccer example produces two content filters: one for the relation gByP and another one for the relation pByB. The routing between multiple content filters is decided based on the dependency graph of the LiLa program. If a node has a single outgoing edge, the incoming data is directly routed to the processor corresponding to the subsequent node. If a node has multiple incoming edges, a join router pattern can be present, which is detected and transformed as described with reference to FIGS. 6A and 6B. The same is the case for a node having multiple outgoing edges, which corresponds to a multicast pattern.

For the local content enricher, LiLa allows specifying facts in a LiLa program. The facts can be treated as a processor (e.g., a node in LDG) and can be automatically placed into the message after a relation with this name is produced.

Message Routing Patterns

In addition to the message transformation patterns, some routing patterns can be derived from the dependency graph such as, for example, Multicast, Message Filter, Content-based Router, and Join Router.

The multicast pattern can be used as part of the common map/reduce-style message processing. The multicast is derived by analyzing the dependency graph for independent rules to which copies of the message are provided.

The message filter removes messages according to a filter condition. In some implementations, a special construct is not necessary for the message filter. For example, filtering of a message can be achieved by performing a content filtering, which leads to an empty message. Empty messages are discarded before sending the message for further processing to a routing goal. This behavior can be used to describe a content-based router, which distinguishes from the filter by its message cardinality of 1:n. However in LiLa, the router can be used with a channel cardinality of 1:n (i.e., multicast) with message filters on each leaving message channel.

The join router can be a structural channel combining pattern. The join router has a channel cardinality of n:1. The join router only combines channels, not messages. For that, an aggregator is used that is defined subsequently.

Routing-Specific Extensions

In some implementations, the more complex routing patterns Aggregator, Splitter, and remote Content Enricher can neither be described by standard DATALOG nor inherently detected in the dependency graph. Special annotations for these patterns can be defined.

Table 4 shows an example definition of an aggregator in LiLa according to an implementation. The @aggregate annotation is associated with pre-defined aggregation strategies like union and either time-(e.g., completionTime=3) or number-of-messages-based completion condition (e.g., completionSize=5). The annotation body includes several DATALOG queries. The message correlation can be based on the query evaluation, where true means that the evaluation result is not an empty set of facts and false otherwise. As the aggregator does not produce facts with a new relation name, but combines multiple messages keeping their relations, it is challenging how to reference to the aggregated relations in a LiLa program as their name does not change (i.e., message producing). In some instances, when building the dependency graph, it is undecidable whether a rule uses the relation prior or after aggregation. In some implementations, to prevent the user specifying explicitly whether he or she means the relation prior or after aggregation in every rule using a predicate used in an aggregator, some or all predicates can be suffixed after an aggregation step with -aggregate by default. In combination with a join router, messages from several entering channels can be combined.

TABLE 4

Definition of an aggregator in LiLa

@aggregate(<aggregationStrategy>,< completionCondition>)
{ <?-<relationName>(<parameter>+).>+ }

Table 5 shows an example definition of a splitter in LiLa according to an implementation. LiLa specifies the splitter as in Table 5 with a new @split annotation, which does not have any parameters in the annotation head. DATALOG queries can be used in the annotation body as splitter expressions. The queries are evaluated on the exchange, and each evaluation result is passed for further processing as a single message. In some implementations, similar to the aggregator, all newly generated relations leaving a splitter are suffixed with -split by default in order to not have to explicitly specify whether the relation prior or after splitting is meant.

TABLE 5

Definition of a splitter in LiLa

@split( ){ <?-<relationName>(<parameter>+).>+ }

Table 6 shows an example definition of a remote content enricher in LiLa according to an implementation. The remote content enricher can be seen as a special message endpoint. In some implementations, for an enricher including data from a file, the filename and format can be specified as shown in Table 6. Similar to the fact source, a set of relations has to be specified. Again, a canonical conversion from the specified file format to the ILP-CDM can be conducted according to the example techniques described above. If the relations to enrich via this construct are already generated by another construct or DATALOG rule, they are enriched after this construct by adding the additional facts to the message. If there is no construct or DATALOG rule producing the relations specified in the annotation body, the relations are enriched directly before their usage. The enricher construct is especially useful when a single message shall be combined with additional information.

TABLE 6

Definition of a remote content enricher in LiLa

@enrich(<filename>,<format>)
{ <relationName(<parameter>+).>+ }

Synthesis of Logic Integration Language Programs

The defined LiLa constructs can be combined into complex representations of integration programs that can be executed by integration systems (e.g., open-source integration system APACHE CAMEL). For instance, if APACHE CAMEL is used as the integration system, the LiLa programs can be compiled into message channels in APACHE CAMEL, namely, CAMEL Routes. In some implementations, to guarantee data-intensive processing, LiLa programs are not synthesized to APACHE CAMEL constructs directly, but to the ILP integration pattern re-definitions that are integrated into the respective system implementations. The example rule-based, graph transformation LiLa compiler toolchain 152 of FIG. 1B can be used to synthesize and compile LiLa programs into executable integration programs by integration systems.

Message Channel/Route Graph

In some implementations, a platform-independent message channel representation, referred to as Route Graph (RG), enables a graph transformation t: LDG→RG and an efficient code generation for different runtime systems. The transformation can include a two-step process: In the first step, a condition is evaluated on each edge or node of the LDG, respectively. If the condition evaluates to true, further processing on this node/edge is performed. The second step is the execution of the actual transformation.

The route graph RG can be defined as $RG=(V_R,E_R)$, where the nodes $V_R$ are runtime components of an integration system (representing an ILP-EIP), and the edges $E_R$ are communication channels from one node $n_1 \in V_R$ to another node $n_2 \in V_R$, or itself $n_1$. The nodes in $V_R$ can be partitioned to different routes, while edges in $E_R$ from one route to another have to be of type to for the source node and of type from for the target node.

Figure 5:
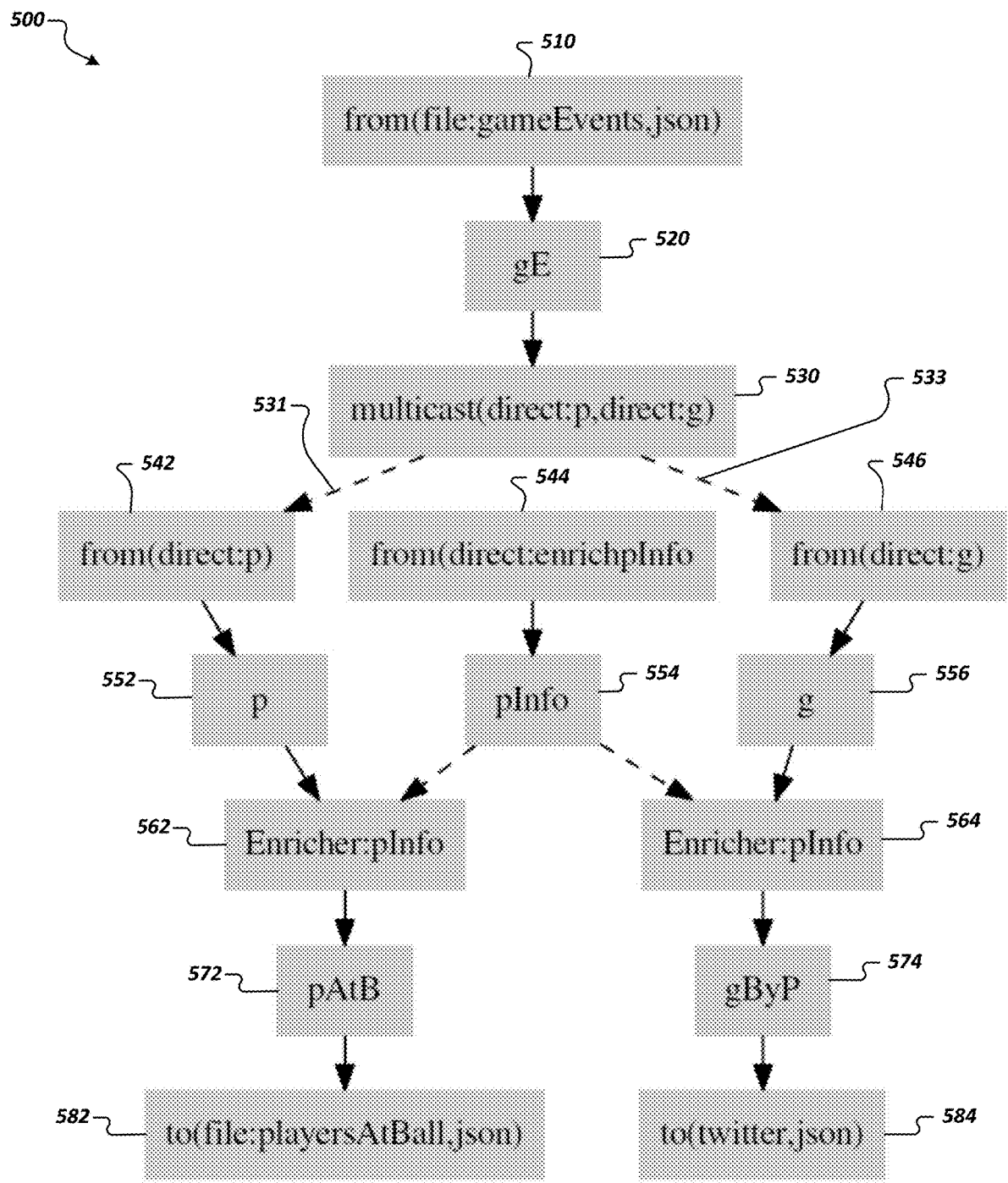
FIG. 5 is a diagram example route graph (RG) corresponding to the LDG of FIG. 4 according to an implementation.

FIG. 5 is an example route graph (RG) 500 corresponding to the LDG 400 of FIG. 4 for the example soccer player event scenario described in FIG. 2 according to an implementation. The message flow (e.g., edges 531 and 533) between separately generated routes (denoted by dashed lines) indicate a to/from construct. Consequently, the LiLa program 300 from FIG. 3 results in four distinct routes, e.g., with a multicast multicast(direct:p,direct:g) 530 and a file-enricher from(direct: enrichpinfo) 544 identified through pattern detection.

Pattern Detection and Transformation

The more complex, structural join router, multicast, and remote enricher patterns can be automatically derived from the LDG 400 through a rule-based pattern detection approach. With these building blocks, optimizations in integration systems, such as the map/reduce-like scatter/gather pattern, which is a combination of the multicast, join router, and aggregator patterns, can be synthesized. The rule-based detection and transformation approach defines a matching function [true|false]=$mf_{LDG,mc}$ on LDG, with matching condition mc and a transformation $t_G$, with $t_G$: LDG→RG. The matching function denotes a node and edge graph traversal on the LDG that evaluates to true if the condition holds, false otherwise. The transformation $t_G$ is executed only if the condition holds.

Join Router

Figure 6A:
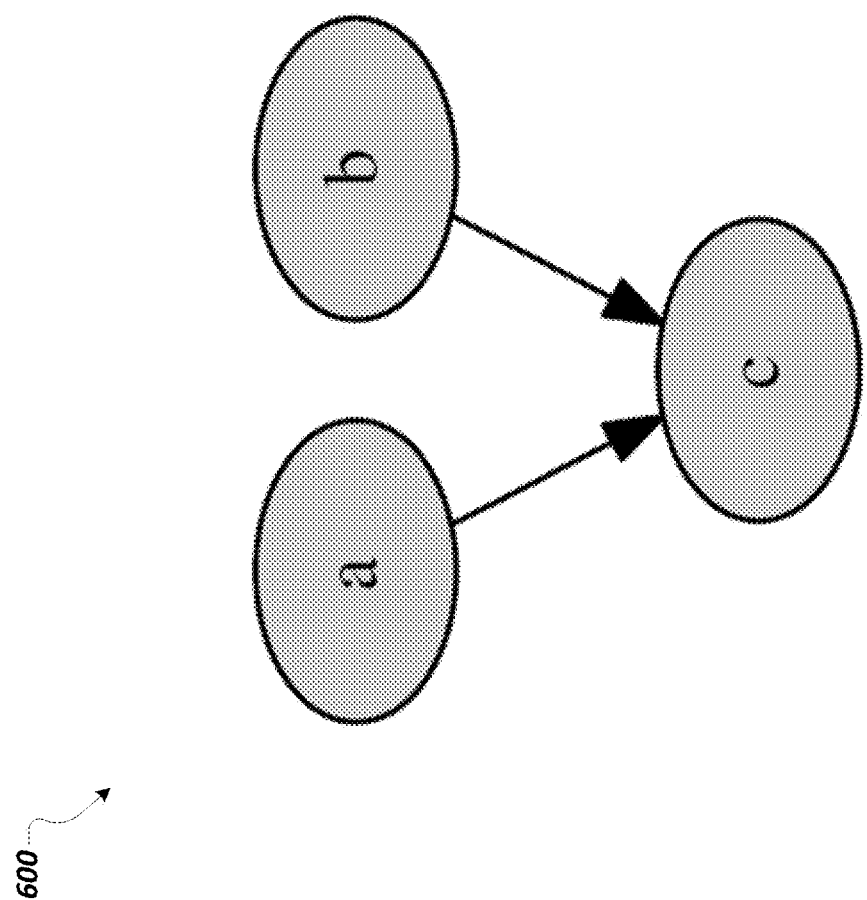
FIG. 6A is an example LDG of a join router pattern.
Figure 6B:
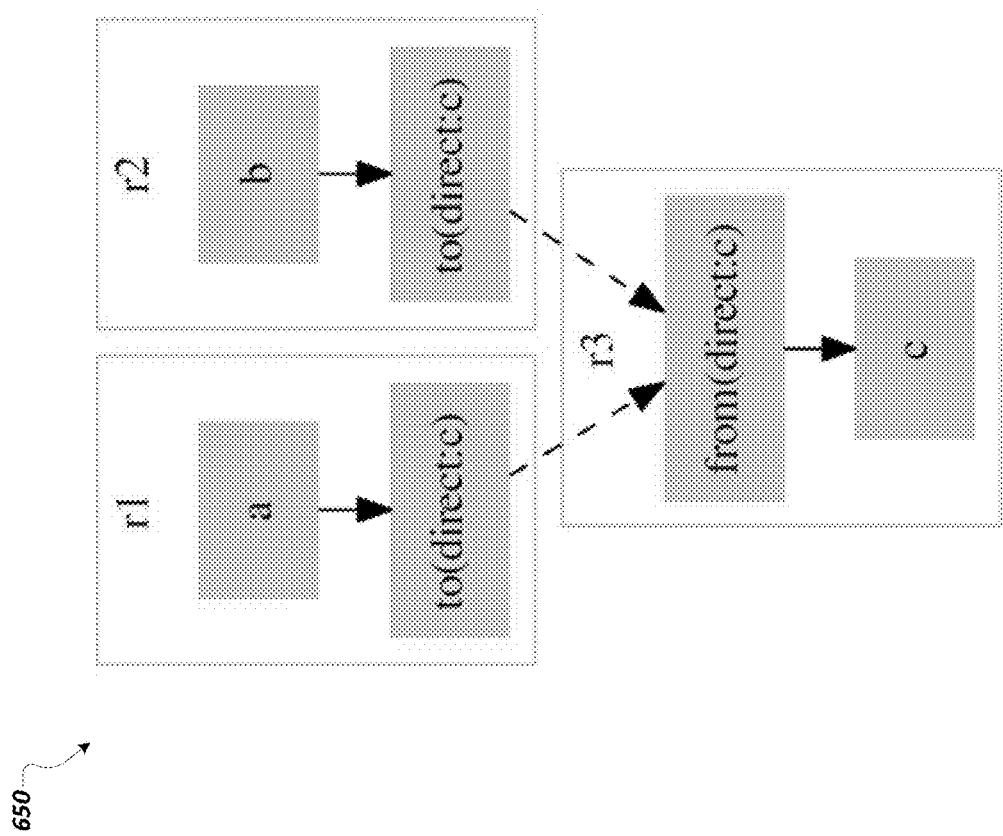
FIG. 6B is an example RG 650 corresponding to the LDG of FIG. 6A according to an implementation.

FIG. 6A is an example LDG 600 of a join router pattern and FIG. 6B is an example RG 650 corresponding to the LDG 600 of FIG. 6A after pattern detection and transformation according to an implementation. The router is a m:1 message channel join pattern, which usually has to be combined with an aggregator to join messages. The match condition is defined as $MC_{JR}=deg^-(n_i)>1$, where $deg^-(n_i)$ determines the number of entering message channels on a specific node $n_i \in V_P$, with $i \in N$. Hence, only in the case of multiple entering edges, the graph transformation $t_{jr}$ is executed. The transformations $t_{jr1-3}$ change the RG: $t_{jr1}$: $n_i \rightarrow n_{fd} \oplus n_i$. For all matching nodes $n_i$, a from-direct node $n_{fd}$ is added, denoted by $\oplus$. Additionally, all nodes $n_j$ with direct, outgoing edges to the matching node get an additional to-direct node $n_{td}$: $n_{jr2}$:$n_j \rightarrow n_j \oplus n_{td}$. Then, all original edges em have to be removed: $t_{jr3}$:$E_P \rightarrow E_P \backslash e_m$.

Multicast

Figure 7A:
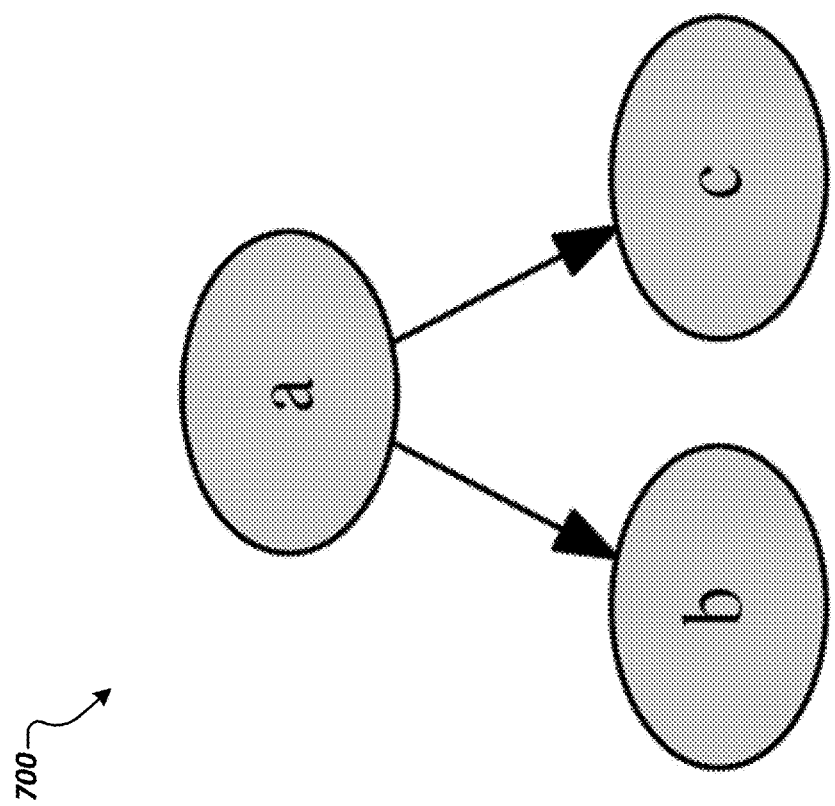
FIG. 7A is an example LDG of a multicast pattern.
Figure 7B:
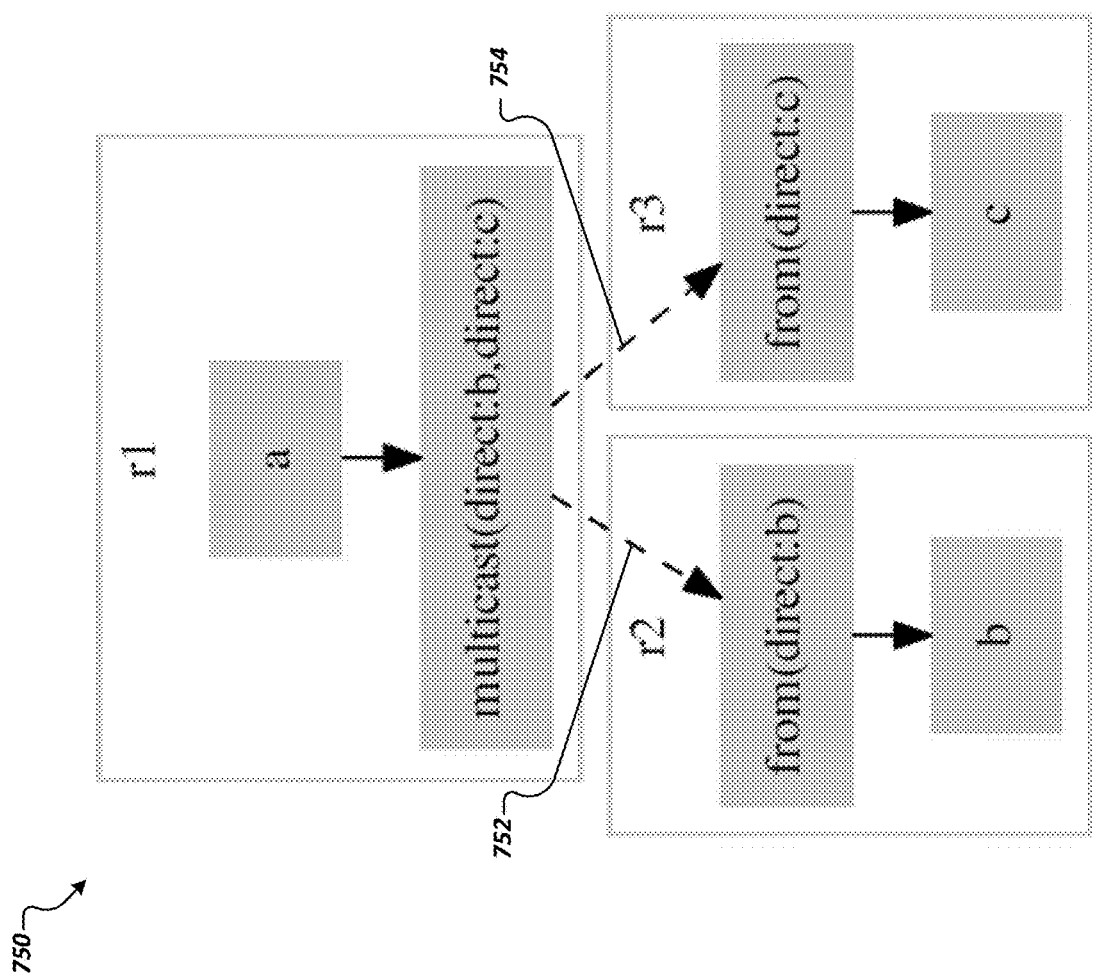
FIG. 7B is an example RG corresponding to the LDG of FIG. 7A according to an implementation.

FIG. 7A is an example LDG 700 of a multicast pattern and FIG. 7B is an example RG 750 corresponding to the LDG 700 of FIG. 7A after pattern detection and transformation according to an implementation. The multicast has a channel cardinality of 1:n. The match condition is defined as $mc_{Mu}=deg^+(n_i)>1$, where $deg^-(n_i)$ determines the number of leaving message channels on a specific node $n_i \in V_P$, with $i \in N$. Hence, only in case of multiple leaving edges, the graph transformation $t_{jr}$ is executed. The transformations $t_{mu1-3}$ change the RG: $t_{mu1}:n_i \rightarrow n_i \oplus n_{multic\{nj\}}$. For all matching nodes $n_i$, a multicast node $n_{multic}$ is added, which references all previous neighboring nodes $n_j$ via leaving edges. Then, a from-direct node $n_{fd}$ is added to all neighboring nodes $n_j$ through transformation $t_{mu2}:n_j \rightarrow n_{fd} \oplus n_j$. Additionally, all original edges $e_m$ have to be removed: $t_{mu3}:E_P \rightarrow E_P \backslash e_m$.

Remote Enricher.

Figure 8A:
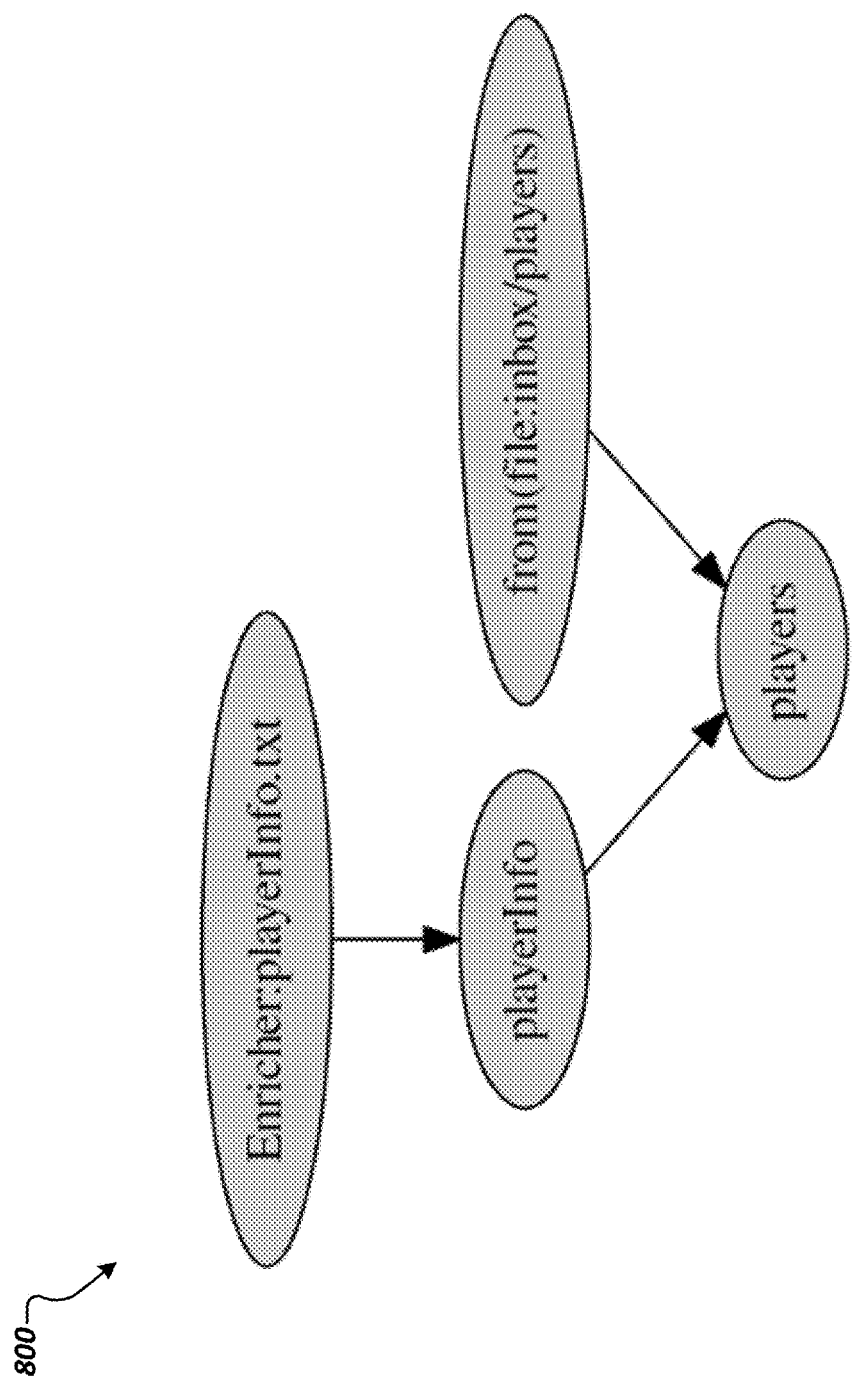
FIG. 8A is an example LDG of a remote enricher pattern.
Figure 8B:
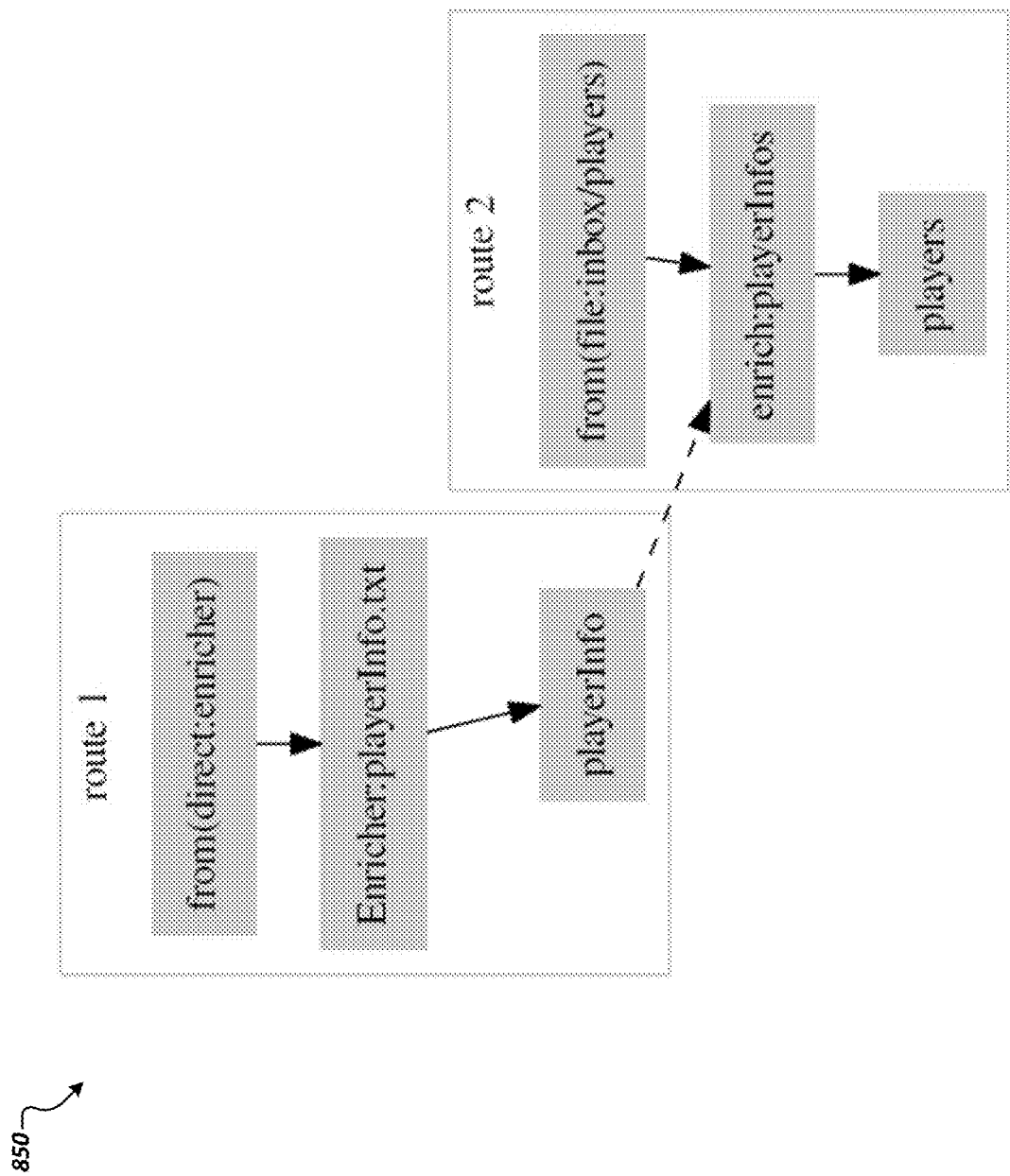
FIG. 8B is an example RG corresponding to the LDG of FIG. 8A according to an implementation.

FIG. 8A is an example LDG 800 of a remote enricher pattern and FIG. 8B is an example RG 850 corresponding to the LDG 800 of FIG. 8A after pattern detection and transformation according to an implementation. An enricher potentially merges several predicate relations to the main route as additional data. Therefore, it has to get a route on its own that (periodically) gathers the respective messages. The intermediate transformation $t_{re}$ is defined as $t_{re1}$: $n_i \oplus \{n_j\} \rightarrow n_{fd} \oplus n_{file} \oplus \{n_j\}$, with $n_i, n_j \in V_P$, which takes all matching enricher nodes $n_i$ and the list of connected nodes $\{n_j\}$ and translates them to a from-direct node $n_{fd}$ that is followed by a file relation $n_{file}$, referencing the connected nodes $\{n_j\}$. Additionally, all original edges $e_m$ from the enricher $n_i$ to the list of connected nodes $\{n_j\}$ have to be removed: $t_{er2}:E_P \rightarrow E_P \backslash e_m$. The match condition for the remote enricher is the node type type($n_i$), determined through the @enrich annotation: $mc_{RE}=type(n_i)==$'enrich'. After the intermediate translation, all produced relations (nodes) that are linked to nodes in the main tree create a join router (cf. transformations $t_{jr1-3}$) with a built-in aggregator that merges the facts, e.g., via union operation. In order to find the complete path of nodes to extract, the leaving edges have to be followed starting at the enricher node until a node that has multiple incoming nodes. Before the node with multiple incoming nodes, a to-direct node is inserted through $t_{jr2}$ (dashed lines 752 and 754). The URI of the call to enricher node is set to the URI of the consumer, which can be added directly before the enricher node.

Message Channel Synthesis

The RG represents the foundation for the code synthesis of the message channels that include a combination of ILP constructs and APACHE CAMEL patterns and routes. The construction of the routes can be based on a graph traversal starting from the fact source nodes. The multicast $t_{mu1,2}$ and join router $t_{jr1-3}$ transformations construct a RG with $deg^-(n)==1$, with $n \in V_R$. Hence, the ILP constructs can be synthesized one after the other based on their types and the ILP properties, which were preserved during the transformations and optimizations.

Figure 9:
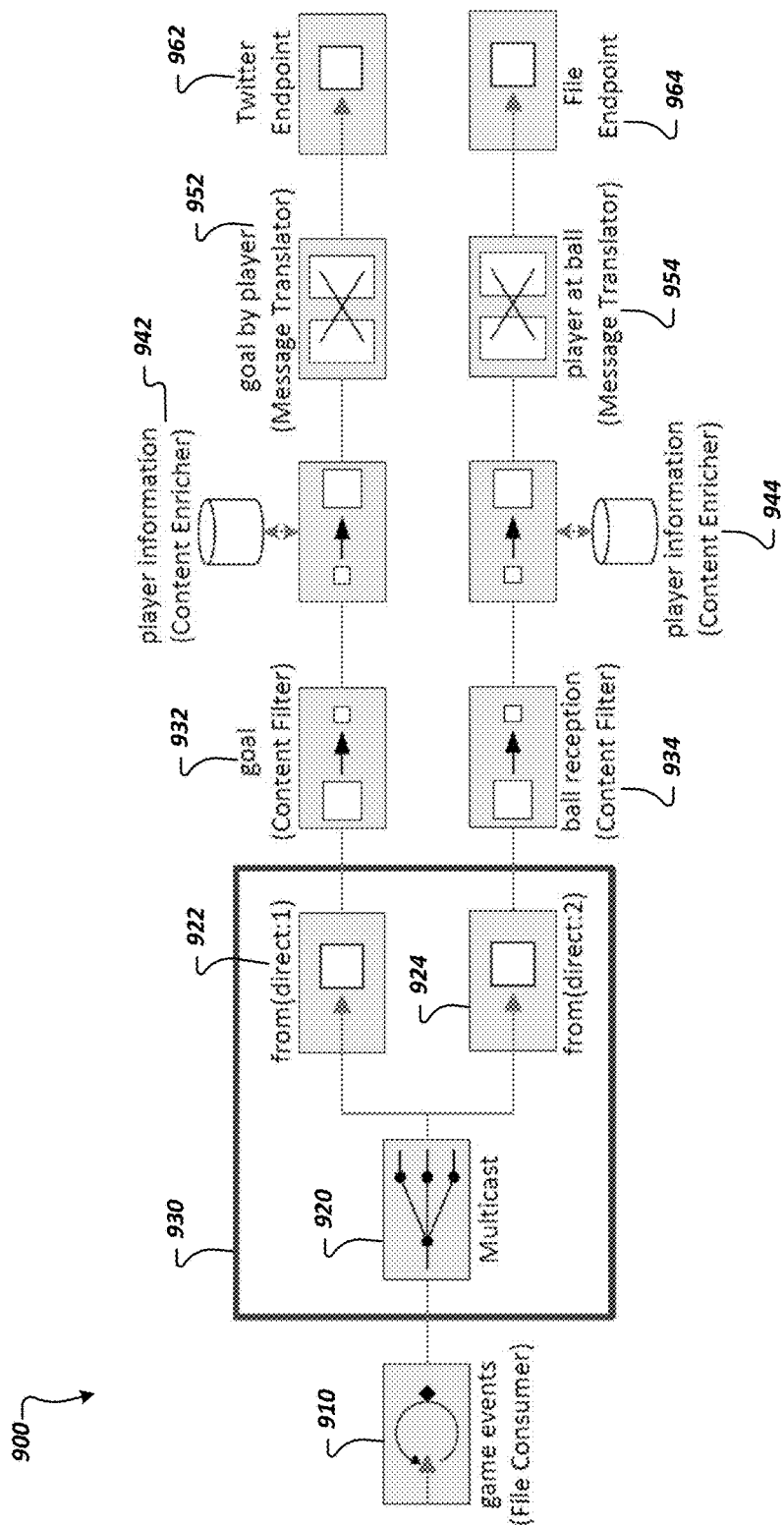
FIG. 9 is an example route graph in enterprise integration pattern (EIP)-icon notation corresponding to the LDG of FIG. 4 according to an implementation.

FIG. 9 is an example route graph 900 in EIP-icon notation corresponding to the LDG 400 of FIG. 4 and the LiLa program in Listing 300 of FIG. 3 for the soccer player event scenario. The RG 900 shows the synthesized APACHE CAMEL routes in the EIP-icon notation. Compared to the example diagram 200 in FIG. 2, the content-based router 220 in FIG. 2 is replaced by a multicast 920, and two message filters 922 and 924 are added before the outbound message endpoints, while preserving the same semantics and allowing for parallel message processing.

Message Endpoints

The fact source and routing goal nodes can be transformed to components in APACHE CAMEL, passing the configurations that are stored in the node properties. A detected (not @from annotated) fact source gets an additional numOfMsgsToAgg property, which remembers the entering message count of a join router (e.g., a structural/channel n:1 element), and a subsequently added, corresponding aggregator ILP (e.g., a message combining m:1 element) with completionSize=numOfMsgsToAgg. The location property defines the component's endpoint configuration and the format leads to the generation of an ILP format converter (e.g., JSON, CSV to DATALOG) that is configured using the meta-facts supplied in the annotation body, conducting an additional projection. In some implementations, if the format is set to DATALOG, no format conversion is needed. The routing goals are configured similarly. A message filter ILP is added that discards empty messages. The format converter (e.g., DATALOG to JSON/CSV) can be added and configured through the meta-facts property. Finally, a CAMEL producer component is added to the route and configured.

Complex Routing Patterns

For the aggregator, additional renamingRules properties and renaming message translators are generated, containing a DATALOG rule that adds -aggregate suffixes to every DATALOG predicate used in the head of a query (for name differentiation). Similarly, for the splitter, -split suffixes are generated that allow additional message translators to rename the predicates. In some instances, this is necessary in order to build the dependency graph.

The inherent multicast nodes are configured through a recipient list property, containing the target node identifiers, which allows for a translation to the CAMEL multicast (no ILP defined).

Message Translation Patterns

The content filter and message translator nodes can be generated to the ILP content filter, which is based on a CAMEL processor and configured accordingly. The node of the inherent content enricher, which can be specified by writing facts into a LiLa program, stores the facts as properties. The generated ILP (again based on a CAMEL processor) adds the facts to every incoming message. The explicit file enricher pattern is configured similarly to a fact source; however, the configuration specifies a fileName property, used to configure the CAMEL component. Again, ILP format converters are added and configured by the meta-facts property.

FIG. 10 is a listing of an example extended LiLa program 1000 of the soccer game event integration scenario of FIG. 2 according to an implementation. In LiLa, program 1000 extends the calculation of the player's position (see posAtShotOnGoal), while shooting on goal, and to sample the player positions on a minute basis by using a recursive rule (see pPosPerMinute). The extended LiLa program 1000 "tweets" the calculated positions and stores them with the "players at ball" to a file, and stores the positions per minute to a database.

Figure 11:
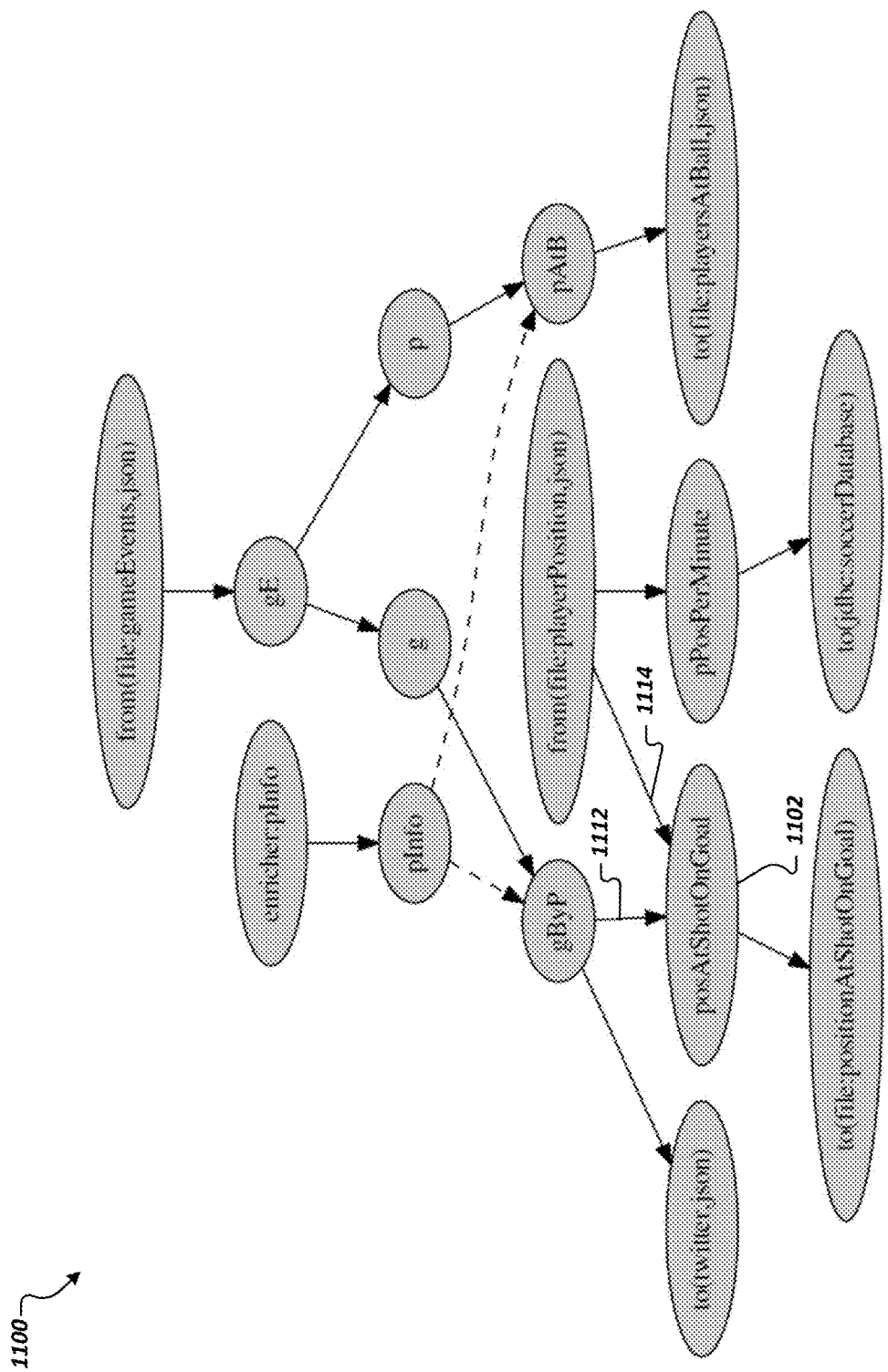
FIG. 11 is an example extended LDG corresponding to the extended LiLa program of FIG. 10.
Figure 12:
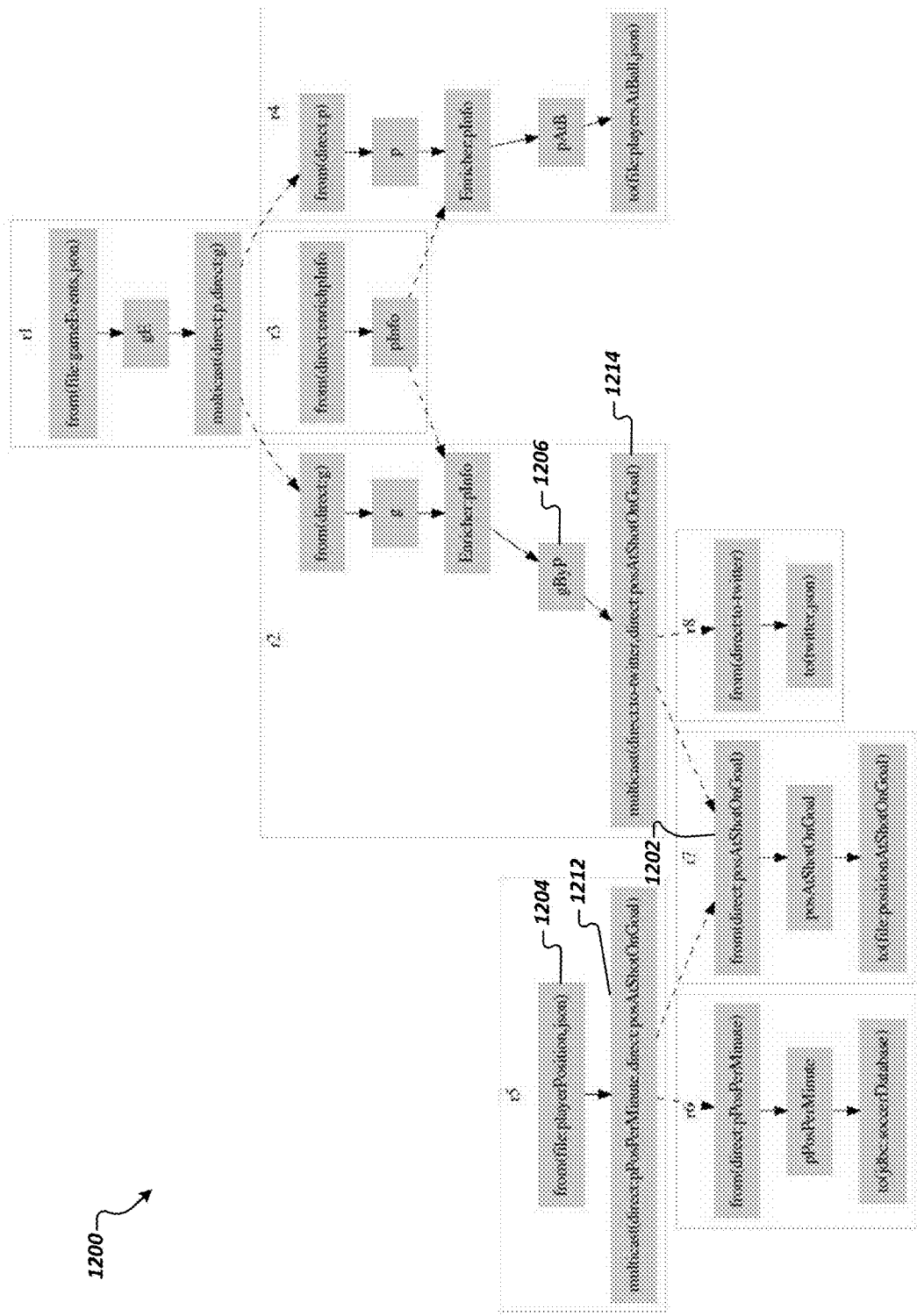
FIG. 12 is an example RG generated based on the LDG 1100 shown in FIG. 11.

FIG. 11 is an example (extended) LiLa dependency graph (LDG) 1100 corresponding to the extended LiLa program 1000 of FIG. 10; FIG. 12 is an example route graph (RG) 1200 generated based on the LDG 1100 shown in FIG. 11. For example, as the node posAtShotOnGoal 1102 in FIG. 11 has multiple incoming arcs 1112 and 1114, a join router pattern is detected and join router pattern 1202 is generated in FIG. 12. Similarly, multicast patterns 1212 and 1214 are generated after the from(file:playerPosition.json) node 1204 and gByP node 1206 based on the detected multicast patterns in FIG. 11.

Figure 13:
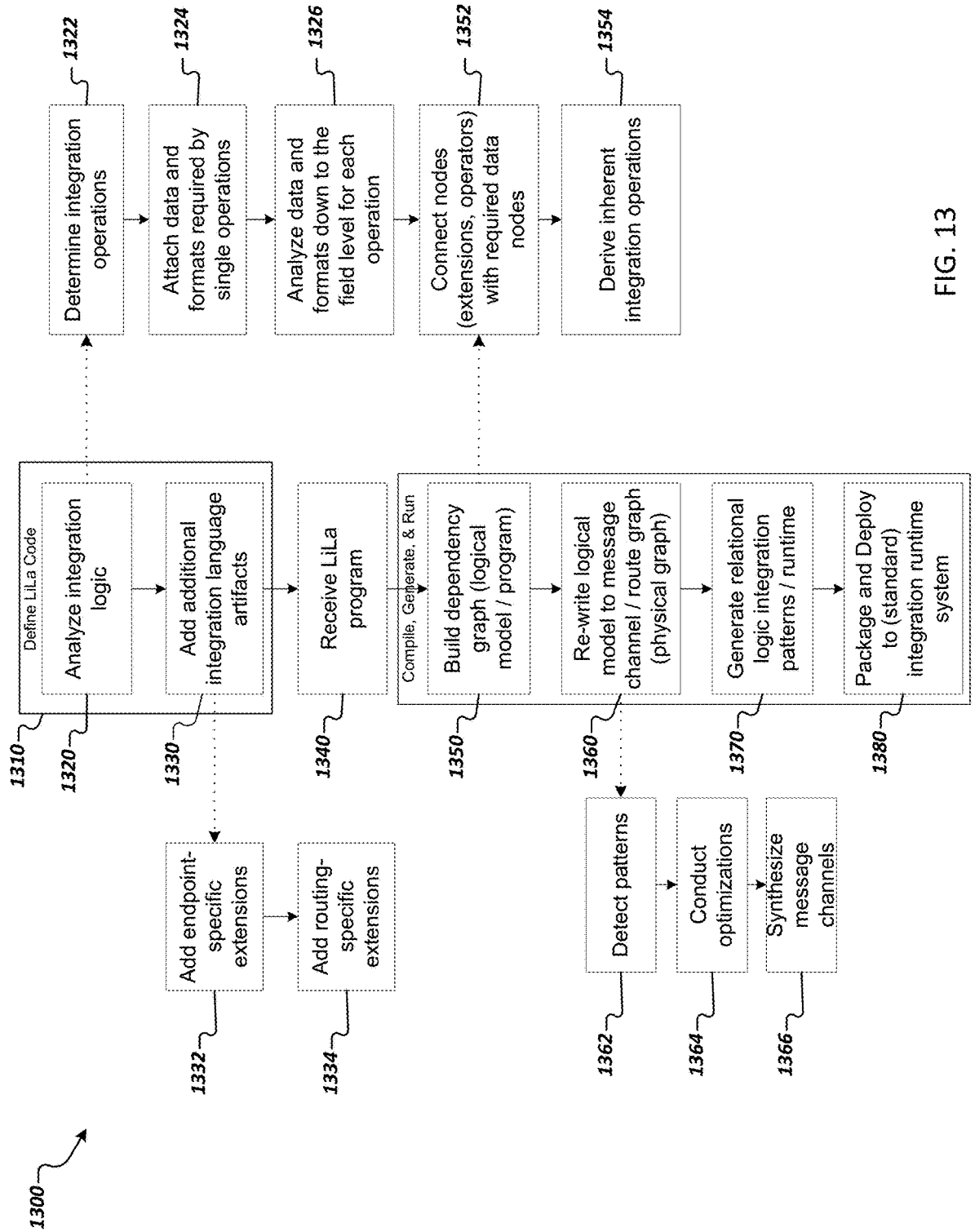
FIG. 13 is a flowchart of an example method for data-centric integration modeling according to an implementation.

FIG. 13 is a flowchart of an example method 1300 for data-centric integration modeling according to an implementation. For clarity of presentation, the description that follows generally describes method 1300 in the context of FIGS. 1-12. However, it will be understood that the method 1300 may be performed, for example, by any other suitable system, environment, software, and hardware, or a combination of systems, environments, software, and hardware as appropriate. For example, the server 104 and/or its components can be used to execute the method 1300.

At 1310, a logic integration program is defined. The logic integration program can include multiple logic integration patterns that are defined using a data-centric logic integration language (LiLa), for example, for declarative integration programming (namely, describing "what" is expected rather than "how" it shall be done). The logic integration program can be defined by representing the logic integration patterns according to the LiLa semantics. Example logic integration programs are shown in Listings 3 and 10 in FIGS. 3 and 10, respectively.

In some implementations, defining a logic integration program can include analyzing integration logic (1320) and adding integration artifacts (1330). In some implementations, integration logic are represented by a logical model graph. In some implementations, analyzing integration logic can include, identifying integration operations such as, routing condition, mapping program, or other operations (1322); attaching data and formats required by single operations (1324), for example, according to the LiLa semantics; and analyzing data and formats down to the field level for each integration operation (1326). A fields is part of a structure of a database table, described by type and value. The dependencies of operations in the logical model graph on these fields can be analyzed and optimizations can be conducted, for example, by early filtering of unused fields, dedicated partitioning/shipment of fields to specific operations, etc. In some implementations, adding additional integration artifacts can include adding endpoint-specific extensions (1332) and adding routing-specific extensions (1334), for example, according to the example techniques described with reference to Tables 2 and 3. In some implementations, a pattern matching approach can be used to detect integration-related artifacts and patterns on the logical model graph. An annotation language (e.g., extension of standard logic programming languages) can be used to allow defining integration artifacts like endpoint configurations, complex routing, etc. From 1310, method 1300 proceeds to 1340.

At 1340, the logic integration program is received, for example, by an integration system 100. From 1340, method 1300 proceeds to 1350.

At 1350, a logical model graph based on the logic integration program is built. The logical model graph can include the LiLa dependency graph (LDG) (e.g., the example LDGs 400 and 1100). The logical model graph can be runtime-independent (namely, it does not rely on any specific integration runtime system). Example techniques for generating the logical model graph are described above with respect to FIGS. 4 and 11. In some implementations, generating the logical model graph can include connecting nodes (including extensions, operators, etc.) with required data nodes (e.g., nodes in the logical model graph that represent the operations on the data, nodes that represent the data, etc.) (1352), and deriving inherent integration operations (1354). For example, content and message filters, multicast, and internal enricher can be derived based on the data flow and message format analysis and best practices (e.g., the map-reduce-like scatter/gather processing). From 1350, method 1300 proceeds to 1360.

At 1360, the logical model graph is converted into a physical model graph. The physical model graph can be runtime-specific (e.g., dependent on a particular integration runtime system (e.g., the integration system runtime 182 in FIG. 1B). For example, the physical model graph can include the example route graphs (RGs) 500 and 1200 that are designed for APACHE CAMEL runtime. Additional or different integration runtime systems can be used. In some implementations, converting the logical model graph into the physical model graph can include detecting patterns of the logical model graph (1362); optimizing the logical model graph (1364); and synthesizing one or more message channels based on the detected patterns (1366), for example, according to the example techniques described with reference to FIGS. 4-12. The physical model graph (e.g., the route graph) can be synthesized by performing a rule-based transformation on the logical model graph (e.g., the LiLa dependency graph) and then be mapped into implementation-specific messaging channels. The logical model graph itself can be an abstract representation of a messaging channel. From 1360, method 1300 proceeds to 1370. Example patterns can include one or more join router patterns, remote enricher patterns, and multicast patterns described with reference to FIGS. 6A-B, 7A-B, and 8A-B, respectively.

At 1370, logic integration runtime codes (or patterns, programs, etc.) executable by the integration system can be generated based on the physical model graph. From 1370, method 1300 proceeds to 1380.

At 1380, the generated logic integration runtime codes can be packaged and deployed to integration runtime system, such as, APACHE CAMEL or other runtime system. After 1380, method 1300 stops.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media, and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user, and a keyboard and a pointing device, e.g., a mouse, trackball, or trackpad, by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in Extensible Markup Language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed:

1. A computer-implemented method comprising: receiving, by operation of an integration system, a logic integration program comprising a plurality of logic integration patterns that are defined in a data-centric logic integration language; generating a logical model graph based on the logic integration program, the logical model graph being runtime-independent; defining the logic integration program by analyzing integration logic represented by the logical model graph and adding integration artifacts, wherein integration artifacts comprise at least one of endpoint-specific extensions or routing-specific extensions; bi-directionally converting the logical model graph into a physical model graph, the physical model graph being runtime-specific by: detecting patterns on the logical model graph; performing a rule-based transformation on the logical model graph; and mapping the transformed logical model graph into implementation-specific messaging channels in accordance with the integration artifacts and generating logic integration runtime codes executable by the integration system based on the physical model graph.

2. The method of claim 1, wherein the logical model graph comprises one or more annotations defined by the data-centric logic integration language as one or more nodes of the logical model graph.

3. The method of claim 1, wherein the logical model graph comprises no cycles.

4. The method of claim 1, further comprising optimizing the logical model graph.

5. The method of claim 1, wherein the routing-specific extension comprises at least one of:
   an aggregator;
   a splitter; or
   a content enricher.

6. The method of claim 1, wherein the endpoint-specific extension comprises at least one of:
   a content filter;
   a message translator; or
   a local content enricher.

7. A non-transitory, computer-readable medium storing computer-readable instructions executable by a computer and configured to:
   receive a logic integration program comprising a plurality of logic integration patterns that are defined in a data-centric logic integration language;
   generate a logical model graph based on the logic integration program, the logical model graph being runtime-independent;
   define the logic integration program by analyzing integration logic represented by the logical model graph and adding integration artifacts, wherein integration artifacts comprise at least one of endpoint-specific extensions or routing-specific extensions;

bi-directionally convert the logical model graph into a physical model graph, the physical model graph being runtime-specific by:
  detecting patterns on the logical model graph;
  performing a rule-based transformation on the logical model graph; and
  mapping the transformed logical model graph into implementation-specific messaging channels in accordance with the integration artifacts; and
generate logic integration runtime codes executable by an integration system based on the physical model graph.

8. The medium of claim 7, wherein the logical model graph comprises one or more annotations defined by the data-centric logic integration language as one or more nodes of the logical model graph.

9. The medium of claim 7, wherein the logical model graph comprises no cycles.

10. The medium of claim 7, the instructions further executable by the computer and configured to optimize the logical model graph.

11. A system, comprising:
a memory;
at least one hardware processor interoperably coupled with the memory and configured to:
  receive a logic integration program comprising a plurality of logic integration patterns that are defined in a data-centric logic integration language;
  generate a logical model graph based on the logic integration program, the logical model graph being runtime-independent;
  define the logic integration program by analyzing integration logic represented by the logical model graph and adding integration artifacts, wherein integration artifacts comprise at least one of endpoint-specific extensions or routing-specific extensions;
  bi-directionally convert the logical model graph into a physical model graph, the physical model graph being runtime-specific by:
    detecting patterns on the logical model graph;
    performing a rule-based transformation on the logical model graph; and
    mapping the transformed logical model graph into implementation-specific messaging channels in accordance with the integration artifacts; and
  generate logic integration runtime codes executable by an integration system based on the physical model graph.

12. The system of claim 11, wherein the logical model graph comprises one or more annotations defined by the data-centric logic integration language as one or more nodes of the logical model graph.

13. The system of claim 11, wherein the logical model graph comprises no cycles.

14. The system of claim 11, wherein converting the logical model graph into the physical model graph comprises:
optimizing the logical model graph.

* * * * *